US010354655B1

(12) United States Patent
White et al.

(10) Patent No.: US 10,354,655 B1
(45) Date of Patent: Jul. 16, 2019

(54) OCCUPANCY COUNTING BY SOUND

(71) Applicant: ABL IP HOLDING LLC, Conyers, GA (US)

(72) Inventors: Sean P. White, Reston, VA (US); Jenish S. Kastee, South Riding, VA (US); Daniel M. Megginson, Fairfax, VA (US); Nathanial W. Hixon, Arlington, VA (US); Niels G. Eegholm, Columbia, MD (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/866,659

(22) Filed: Jan. 10, 2018

(51) Int. Cl.
| H04R 3/00 | (2006.01) |
| G10L 17/00 | (2013.01) |
| H04W 4/33 | (2018.01) |
| H05B 37/02 | (2006.01) |
| H04W 4/80 | (2018.01) |
| H04R 1/02 | (2006.01) |
| H04R 1/32 | (2006.01) |
| H04B 1/00 | (2006.01) |

(52) U.S. Cl.
CPC ............ *G10L 17/005* (2013.01); *H04R 1/028* (2013.01); *H04R 1/326* (2013.01); *H04W 4/33* (2018.02); *H04W 4/80* (2018.02); *H05B 37/0227* (2013.01)

(58) Field of Classification Search
CPC ........ G10L 17/005; H04W 4/33; H04W 4/80; H04R 1/028; H04R 1/326; H05B 37/0227
USPC .......................................................... 381/122
See application file for complete search history.

(56) References Cited

U.S. PATENT DOCUMENTS

| 8,909,382 | B1* | 12/2014 | Malakuti ............ H05B 37/0227 |
| | | | 700/296 |
| 2016/0142851 | A1* | 5/2016 | Sun ...................... H04R 29/002 |
| | | | 381/20 |
| 2016/0330824 | A1* | 11/2016 | Recker ............... H05B 33/0842 |
| 2016/0345412 | A1* | 11/2016 | Aggarwal .......... H05B 37/0227 |
| 2017/0134853 | A1* | 5/2017 | Beaty .................... H04R 3/005 |
| 2017/0176964 | A1* | 6/2017 | O'Keeffe ............... G05B 15/02 |

* cited by examiner

Primary Examiner — Xu Mei
Assistant Examiner — Ammar T Hamid
(74) Attorney, Agent, or Firm — RatnerPrestia

(57) ABSTRACT

System and method examples offer ways to count occupants in an area by sound. A system includes a data network, a light fixture having intelligent driver circuitry coupled to a light source, a lighting control device to control a light output and operations of the light source in an area, and a microphone coupled to the lighting control device. The lighting control device includes programming that configures a processor to control the microphone to sample and detect sound in the area, determine a location of the detected sound relative to a position of the microphone coupled to the lighting control device, and increment an occupant counter to correspond to each newly determined location of sound in the area for a predetermined period of time.

25 Claims, 19 Drawing Sheets

OCCUPANCY COUNTING BY SOUND

TECHNICAL FIELD

The present subject matter relates to techniques and equipment of using sound to count occupants. Additional sensing or sensor fusion may be included in the occupancy counting.

BACKGROUND

In recent years, a number of systems and methods have been used for occupancy counting within a particular area. Examples of such systems include video sensor monitoring systems, thermal sensor systems, infrared systems, global positioning systems (GPS), and wireless communication systems. However, many of these systems have disadvantages. For example, the video sensor monitoring system requires a considerable amount of dedicated sensors that are expensive or cameras that need consistent lighting to record, and that require a large amount of memory for storing data. Often, infrared systems mounted on doors/frames at entry points and are less accurate, especially when more than one person or an object crosses or breaks the light beam upon entry to or exit from the area. The GPS sensor system uses orbiting satellites to communicate with the terrestrial transceiver to determine a location of the occupant in the area, requires each person to have a device capable of receiving satellite signals, and communicates location results to a server or the like that does the counting. However, such GPS based systems are generally less effective indoors or in an environment in which satellite signals can be blocked, thereby, reducing accuracy of counting an occupant in the area.

Electrically powered artificial lighting has become ubiquitous in modern society. Since the advent of light emitters, such as lighting emitting diodes (LEDs), for general lighting type illumination application, lighting equipment has become increasingly intelligent with incorporation of sensors, programmed controller and network communication capabilities. Automated control may respond to a variety of sensed conditions, such as a daylight or ambient light level and occupancy. Commercial grade lighting systems today utilize special purpose sensors and related communications to aide in occupancy detection, for example, to turn on light when a room is occupied and to turn the light off when the room is no longer occupied for some period or to adjust a HVAC system.

A need exists for providing an improved system and method of counting or more accurately estimating the number of occupants in an area.

SUMMARY

The concepts disclosed herein alleviate the above noted problems with detecting occupancy and counting people in a sensor ecosystem.

A system and method use audio or sound detected by a microphone or an array of microphones co-located within a light fixture or accessible to a plurality of light fixtures in a premises to obtain an ambience of the room, such that it is possible to track a particular voice or audio sound that is distinctive within the space to count a number of occupants within the premises.

In an example, a system may include a data network and a light fixture, the light fixture includes a light source; intelligent driver circuitry coupled to the light source to provide power to the light source; a lighting control device coupled to the intelligent driver circuitry to control a light output and operations of the light source in an area; and a network interface to enable the light fixture to receive communication via the data network. A microphone may be arranged within the light fixture or coupled to the lighting control device. The lighting control device of the light fixture may include a processor coupled to the network interface and the microphone. Memory accessible to the processor stores programming for execution by the processor and data to be stored or processed by the processor during execution of instructions included in the programming. Execution of the programming in the memory causes the processor to: control the microphone to sample and detect a sound in the area; analyze the detected sound to determine a sound type and predetermined decibel level; determine a location of the detected sound relative to a position of the microphone coupled to the lighting control device of the light fixture; store the determined location of the sound in the memory; and increment an occupant counter to correspond to each newly determined location of sound in the area for a predetermined period of time.

Another example relates to a method of using sound localization to count occupants. The method includes: controlling a microphone accessible to each of a plurality of light fixtures to sample sound in an area; analyzing the sampled sound from the microphone accessible to each of the plurality of light fixtures to detect an audio frequency level of the sampled sound; and calculating, when the audio frequency level is at least a predetermined threshold level, location information of the sampled sound. The calculating includes: determining a time, intensity, and frequency of the sound in the area; comparing a phase of the sampled sound using the determined time, intensity, and frequency of each sampled sound to determine an order of sound reception to the microphone in the area to provide a noise vector of the sound; incrementing an occupancy counter for each noise vector; and storing the order of sound reception information and an identification of the microphone from which the sound is received in a memory.

Another example relates to a method of voiceprinting to count occupants. The method includes: controlling a microphone accessible to each of a plurality of light fixtures to sample audio in an area; analyzing the sampled audio from the microphone to determine an audio frequency level of the sampled audio; determining whether the sampled audio is a predetermined threshold level of a human voice based upon the audio frequency level; recording audio of the human voice received by the microphone for a timed duration of the human voice in the area; calculating a voiceprint of the human voice in the area based upon applying a fast Fourier transform (FFT) to the recorded audio of the human voice; storing the voiceprint in a memory; and incrementing an occupant counter to correspond to the stored voiceprint.

Another example relates to a method of using audio-printing to count a number of occupants. The method includes: emitting, via an audio speaker accessible to a plurality of light fixtures arranged in an area, an ambient sound in a background environment of the area; adding, during a training mode, a specific number of occupants to the area; calculating a baseline audio-print for the ambient sound based upon each specific number of occupants added in the area during the training mode; comparing the baseline audio-print to the ambient sound to provide a baseline of change in ambient sound for each specific number of occupants added in the area; controlling, after the training mode, a microphone accessible to each of the plurality of light fixtures to sample audio in the area of the plurality of light fixtures; analyzing the sampled audio from the microphone to determine an audio frequency level of the sampled audio; determining whether the audio frequency level of the sampled audio is greater than a predetermined decibel level of the ambient background sound; recording audio in the area for a period of time when the audio frequency level is greater than the predetermined decibel level of the ambient sound in the background environment of the area; calculating, via application of a fast Fourier transform (FFT) analysis, an audio-print for the recorded audio based upon a difference in a decibel level between the recorded audio and the ambient sound emitted into the area; comparing the calculated audio-print to the baseline audio-print to determine a corresponding number of occupants in the area when the calculated audio-print is approximately the same as the baseline audio-print; and incrementing an occupant counter for each corresponding determined number of occupants when the calculated audio-print is approximately the same as the baseline audio-print.

Additional advantages and novel features of the examples will be set forth in part in the description which follows, and in part will become apparent to those skilled in the art upon examination of the following and the accompanying drawings or may be learned by production or operation of the examples. The advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

DETAILED DESCRIPTION

Figure 1:
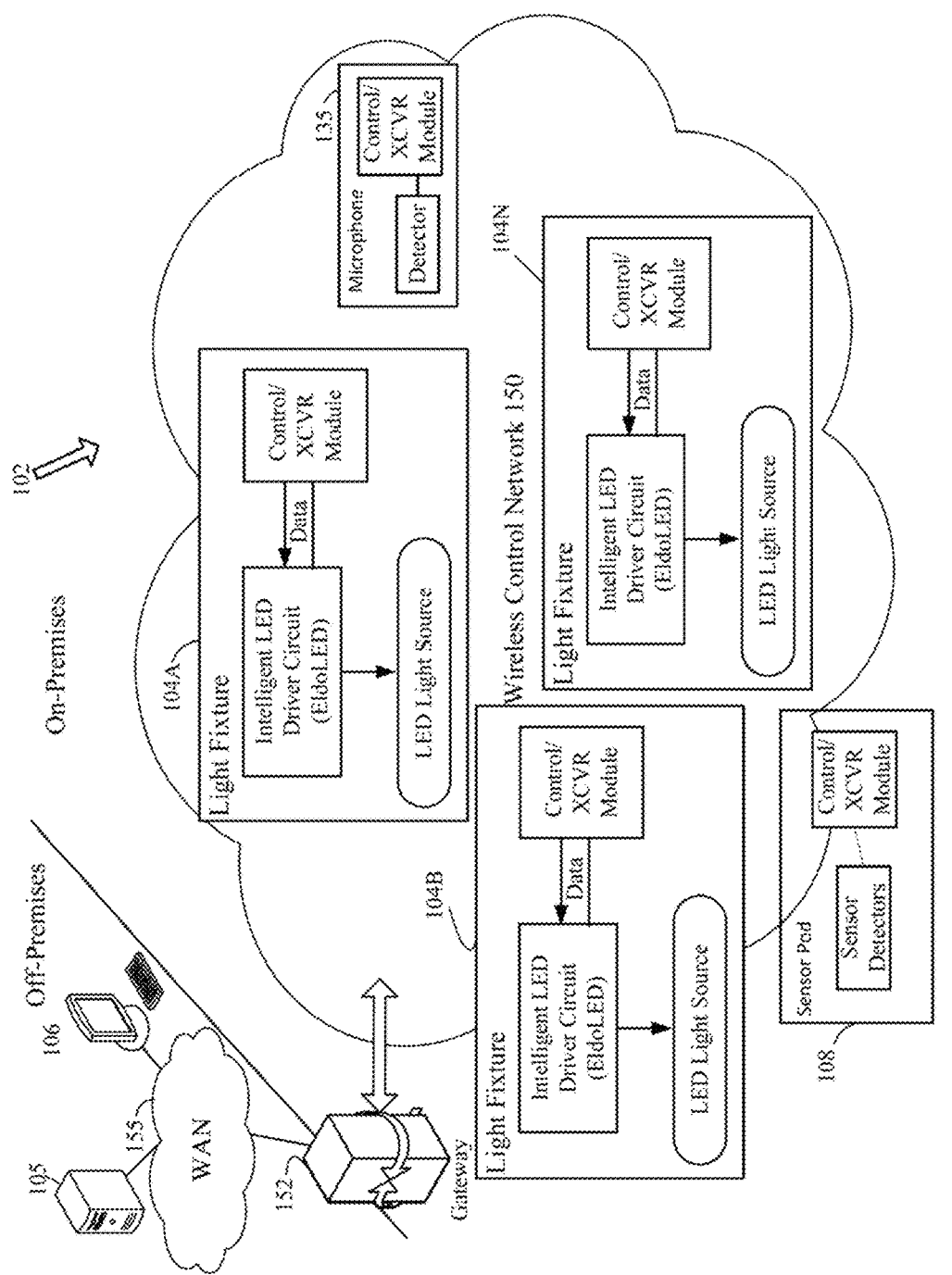
FIG. 1 is a simplified block diagram illustrating an example of a lighting system of networks and devices that provide a variety of lighting capabilities and occupancy counting using sound.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to lighting system hardware and software integration to accomplish occupant counting or estimation using sound. Occupancy detection, meaning the presence of a person within an area, has traditionally been completed using sensors to detect vibration or movement, temperature, $CO_2$, video, and audio within an area for a particular timeframe. However, even with the use of cameras and high-end thermal data, it is hard to accurately and consistently compute the number of occupants in a room. As an improvement, using audio or sound detected by a microphone or an array of microphones co-located within a light fixture or accessible to a plurality of light fixtures, an ambience of the room can be obtained such that it is possible to track a particular voice or audio sound that is distinctive within the space to more accurately count a number of occupants within the space. Also, combining or fusing data from multiple sensor types, such as a passive infrared or temperature sensors improves the information available by providing additional data from the multiple sources that can be correlated for the occupant counting calculations. For example, data from a PIR sensor, which has a binary function of ON or OFF, can be used to verify audio from a single localized voice in a space, or detect a person who is present in the space but missed by the microphone due to lack of noise. The results of a temperature sensor provides detection input over a time period by, for example, watching the temperature of a room increase over time, which would help solidify and increased count of occupancy that a microphone would have sensed. If the temperature begins to decrease and there were a number of occupants added to the system by the microphones, the data from the temperature sensor could be used to indicate a number of people leaving the space.

The term "luminaire" or "light fixture", as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a light fixture may provide light for use by automated equipment, such as sensors/monitors, robots, etc. that may occupy or observe the illuminated space, instead of or in addition to light provided for an organism. A light fixture, for example, may take the form of a lamp or other luminaire that incorporates a source, where the source by itself contains no intelligence or communication capability (e.g. LEDs or the like, or lamp ("regular light bulbs") of any suitable type). Alternatively, a fixture or luminaire may be relatively dumb but include a source device (e.g. a "light bulb") that incorporates the intelligence and communication capabilities discussed herein;

In most examples, the light fixtures 104A-104N illuminate a service area to a level useful for a human in or passing through the space, e.g. regular illumination of a room or corridor in a building or of an outdoor space such as a street, sidewalk, parking lot or performance venue. However, it is also possible that one or more luminaires in or on a particular premises have other lighting purposes, such as signage for an entrance or to indicate an exit. The actual source of illumination light in or supplying the light for a luminaire may be any type of artificial light emitting device, several examples of which are included in the discussions below.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Light output from the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output from the device.

The present teachings regarding capture of data or information from light fixture outputs in an area and/or microphone and other sensor detections in the area are applicable to a variety of systems that support various types of applications. By way of example, the description and drawings concentrate on applications for counting occupants using sound. Systems and methods are provided that support counting occupants using sound detected by a single or multiple microphones accessible to a plurality of light fixtures in an area.

Reference now is made in detail to the examples illustrated in the accompanying drawings and discussed below. FIG. 1 is a simplified block diagram illustrating an example of a lighting system of networks and devices that provide a variety of lighting capabilities and occupancy counting using sound. In FIG. 1, a lighting system 102 using, for example, a wireless control network 150 and devices that provide a variety of lighting capabilities, including communication in support of lighting functions such as turning lights on/off, dimming, or utilizing a light fixture 104A-104N, for example, for counting occupants on the premises of the lighting system 102 using sound detected by microphone 135 which is accessible to the light fixture 104A-104N via the wireless control network 150. The microphone 135 may be arranged within the light fixture or outside the light fixture. It should be understood that the term "lighting control device" means a device that includes a controller (e.g. a Control/XCR module or micro-control unit) that executes a lighting application for communication, in the example, over a wireless lighting network communication band, of control and systems operations information during control network operation over the lighting network communication band and during associated occupant counting. Alternatively, although the lighting system 102 is shown communicating to/from the wireless control network 150, the system 102 may use wired communication via wired links or optical fibers and a local area network (LAN) or the like.

A lighting system 102 may be designed for indoor commercial spaces, although the system may be used in outdoor or residential settings. As illustrated in FIG. 1, system 102 includes a variety of lighting control devices, such as a set of lighting devices (a.k.a. light fixtures or luminaires) 104A-104N (light fixtures), a microphone 135, and a sensor pod 108 including a plurality of sensors or detectors. Sensors, such as daylight, ambient light, motion, or audio, for example, a microphone, may be embedded in the sensor pod 108 or the lighting devices, in this case light fixtures 104A-104N. The microphone 135, which detects audio sound in the area, is accessible to the light fixtures 104A-104N to enable occupancy counting in the system 102 to be completed using the detected sound from the microphone 135. Examples of the microphone arranged within the lighting devices are described and illustrated further below.

The example wireless network 150 may use any available standard wireless data communication technology, such as WiFi, Bluetooth, ZigBee, LiFi, etc. Li-Fi is a form of visible light communication and a subset of optical wireless communication (OWC), and uses light from light-emitting diodes (LEDs) as a medium to deliver networked, mobile, high-speed communication in a similar manner to WiFi with the exception that WiFi utilizes radio waves, while LiFi uses visible light. Alternatively, the wireless network may use a proprietary protocol and/or operate in an available unregulated frequency band, such as the protocol implemented in nLight® Air products, which transport lighting control messages on the 900 MHz band (an example of which is disclosed in U.S. patent application Ser. No. 15/214,962, filed Jul. 20, 2016, now allowed, entitled "Protocol for Lighting Control Via a Wireless Network," the entire contents of which are incorporated herein by reference). The system may support a number of different lighting control protocols, for example, for installations in which consumer selected luminaires of different types are configured for a number of different lighting control protocols.

The system 102 also includes a gateway 152, which engages in communication between the lighting system 102 and a server 105 through a network such as wide area network (WAN) 155. The WAN 155 outside the premises, may be an intranet or the Internet, for example. Although FIG. 1 depicts server 105 as located off premises and accessible via the WAN 155, any one of the light fixtures 104A-104N, for example are configured to communicate a count for the number of occupants in an area to devices such as the server 105 or even, for example, a laptop 106 located off premises.

The on-premises in FIG. 1 may be any location or locations serviced for lighting and other purposes by a networked intelligent lighting system of the type described herein. The light fixtures 104A-104N are located to provide lighting service in various areas in or about the premises. Most of the examples discussed below focus on building installations, for convenience, although the system may be readily adapted to outdoor lighting. Hence, lighting system 102 provides lighting, and possibly other services, in a number of service areas in or associated with a building, such as various rooms, hallways, corridors or storage areas of a building and an outdoor area associated with the building. Any building forming or at the premises, for example, may be an individual or multi-resident dwelling or may provide space for one or more enterprises and/or any combination of residential, office and enterprise facilities.

The lighting system 102 can be deployed in standalone or integrated environments. System 102 can be an integrated deployment, or a deployment of standalone groups with no gateway 152. One or more groups of lighting system 102 may operate independently of one another with no backhaul connections to other networks.

The light fixtures 104A-104N, as well as any other equipment of the system 102 that uses wireless control network 150 on premises connect together with and through network links and any other media forming the communications network 150. For lighting operations, the light fixtures 104A-104N (and any other system elements) for a given service area are coupled together for network communication with each other through data communication media to form a portion of a physical data communication network. Similar elements in other service areas on premises are coupled together for network communication with each other through data communication media to form one or more other portions of the physical data communication network on the premises. Local communication over the network, for example, enables some number of lighting devices serving a room or other area to coordinate user identifications, input processing, light source control, e.g. to provide coordinated illumination of the particular space. Lighting system 102 can leverage existing sensor and fixture control capabilities of Acuity Brands Lighting's commercially available nLight® wired product through firmware reuse. In general, Acuity Brands Lighting's nLight® wired product provides the lighting control applications. However, the illustrated lighting system 102 includes a communications backbone and includes model-transport, network, media access control (MAC)/physical layer (PHY) functions.

Lighting control 102 may comprise a mix and match of various indoor systems, wired lighting systems (e.g., nLight® wired), or wireless lighting systems (e.g. nLight® Air), emergency, and outdoor (dark to light) products that are networked together to form a collaborative and unified lighting solution. Additional control devices and light fixtures, gateway(s) 152 for backhaul connection, time sync control, data collection and management capabilities, and interoperation with the Acuity Brands Lighting's commercially available SensorView product may also be provided.

Figure 2:
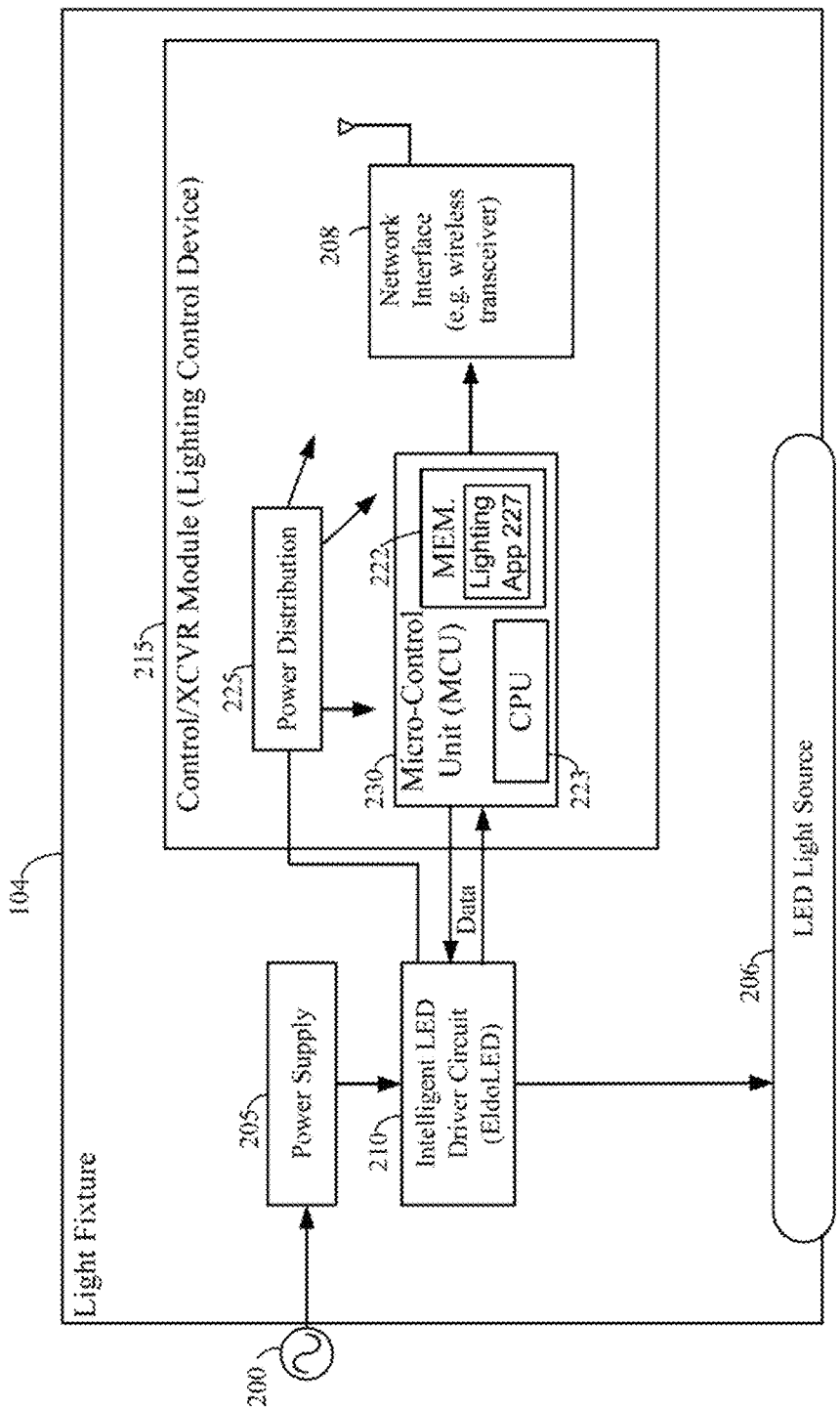
FIG. 2 is a block diagram of a light fixture that operates in and communicates via the lighting system of FIG. 1.

FIG. 2 is a block diagram of a lighting device (in this example, a light fixture) 104 that operates in and communicates via the lighting system 102 of FIG. 1. Light fixture 104 is an integrated lighting device that generally includes a power supply 205 driven by a power source 200. Power supply 205 receives power from the power source 200, such as an AC main, battery, solar panel, or any other AC or DC source. Power supply 205 may include a magnetic transformer, electronic transformer, switching converter, rectifier, or any other similar type of circuit to convert an input power signal into a power signal suitable for light fixture 104.

Light fixture 104 further includes an intelligent LED driver circuit 210, control/XCVR module 215, and, a light source which is, for example, a light emitting diode (LED) light source 206. In most examples, the light fixture 104 illuminates a service area to a level useful for a human in or passing through the space, e.g. regular illumination of a room or corridor in a building, such as a store, and/or provide an indoor visible light source based positioning system. For purposes of example, the light source 206 is illustrated and described as a LED-type light; however, the light source 206 may be virtually any type of light source suitable to providing the intended type of light output that may be electronically controlled. The light source 206, for example, may provide visible light output as providing visible illumination for human occupancy or the like and/or visible light source based positioning. The light source 206 may be of the same general type in all of the light fixtures 104A-104N, e.g. all formed by some number of light emitting diodes (LEDs); although in many installations, some numbers of the light fixtures 104A-104N may have different types of light sources 206, e.g. some use LEDs, some use compact or tube type fluorescent sources, etc. Additionally, daylight or ambient light sensors or microphones may be embedded in the light fixtures to further enhance the occupancy counting.

Intelligent LED driver circuit 210 is coupled to LED light source 206 and drives the LED light source 206 by regulating the power to the LED light source 206 by providing constant quantity or power LED light source 206 as its electrical properties change with temperature, for example. The intelligent LED driver circuit 210 includes a driver circuit that provides power to LED light source 206. Intelligent LED driver circuit 210 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 210 is manufactured by EldoLED.

LED driver circuit 210 can further include an AC or DC current source or voltage source, a regulator, an amplifier (such as a linear amplifier or switching amplifier), a buck, boost, or buck/boost converter, or any other similar type of circuit or component. LED driver circuit 210 outputs a variable voltage or current to the LED light source 820 that may include a DC offset, such that an average value is nonzero, and/or an AC voltage.

Control/XCVR module 215 includes power distribution circuitry 225 and a micro-control unit (MCU) 230. As illustrated in FIG. 2, MCU 230 is coupled to the LED driver circuit 210 and controls the light source operation of the LED light sources 206. MCU 230 includes a memory 222 (volatile and non-volatile) and a central processing unit (CPU) 223 that are coupled by a network interface 208. The CPU 223 is also coupled to communicate via the network interface 208 and the network link with one or more others of the light fixtures or devices of the system of FIG. 1. The MCU 230 and CPU 223 may be implemented via hardwired logic circuitry, but in the examples, the processor is a programmable processor such as a central processing unit (CPU) 223 of a microcontroller or a microprocessor. The memory 222 stores programming for execution by the CPU 223 of the micro-control unit 230 and data that is available to be processed or has been processed by the CPU 223. The memory for example, may include a lighting application 227 (which can be firmware) for both occupancy counting and lighting control operations. The processors and memories in the light fixtures may be substantially the same throughout the devices 104A-104N on-premises, or different light fixtures 104A-104N may have different processors 223 and/or different amounts of memory 222, depending on differences in intended or expected processing needs. The power distribution circuitry 225 distributes power and ground voltages to the MCU 230, wireless transceiver 208, to provide reliable operation of the various circuitry on the Control/XCVR module 215.

The network interface 208 in each light fixture 104 in a particular service area will be of a physical type and configured to operate in a manner that is compatible with the physical media and electrical protocol(s) implemented for the particular service area and/or throughout the premises of the system. Although FIG. 2 shows the light fixture 104 having one network interface 208, some or all of the light fixtures 104 may have two or more network interfaces 208 to enable data communications over different media with the network(s) and/or with other devices in the vicinity.

In the examples, the control/XCVR module 215, microphone 135 and the network interface 208 are shown as integrated with the other elements of the light fixture 104 or attached to the light fixture 104 or other elements that incorporate the light source 206. However, for some installations, the light source 206 may be attached in such a way that there is some separation between the light fixture or other element that incorporates the electronic components that provide the intelligence and communication capabilities. For example, the communication components and possibly the CPU 223 and memory 222 may be elements of a separate device or component coupled and/or collocated with the light source 104.

Each of the light fixtures 104A-104N may further include an audio output component, such as one or more speakers (not shown), configured to provide information output to a user or transmit audio, for example, ambient sounds, into the premises. When the speaker is provided in the same or different light fixture 104, there may be a single speaker in each such light fixture 104 or there may be some number of speakers in each respective light fixture 104.

Figure 3A:
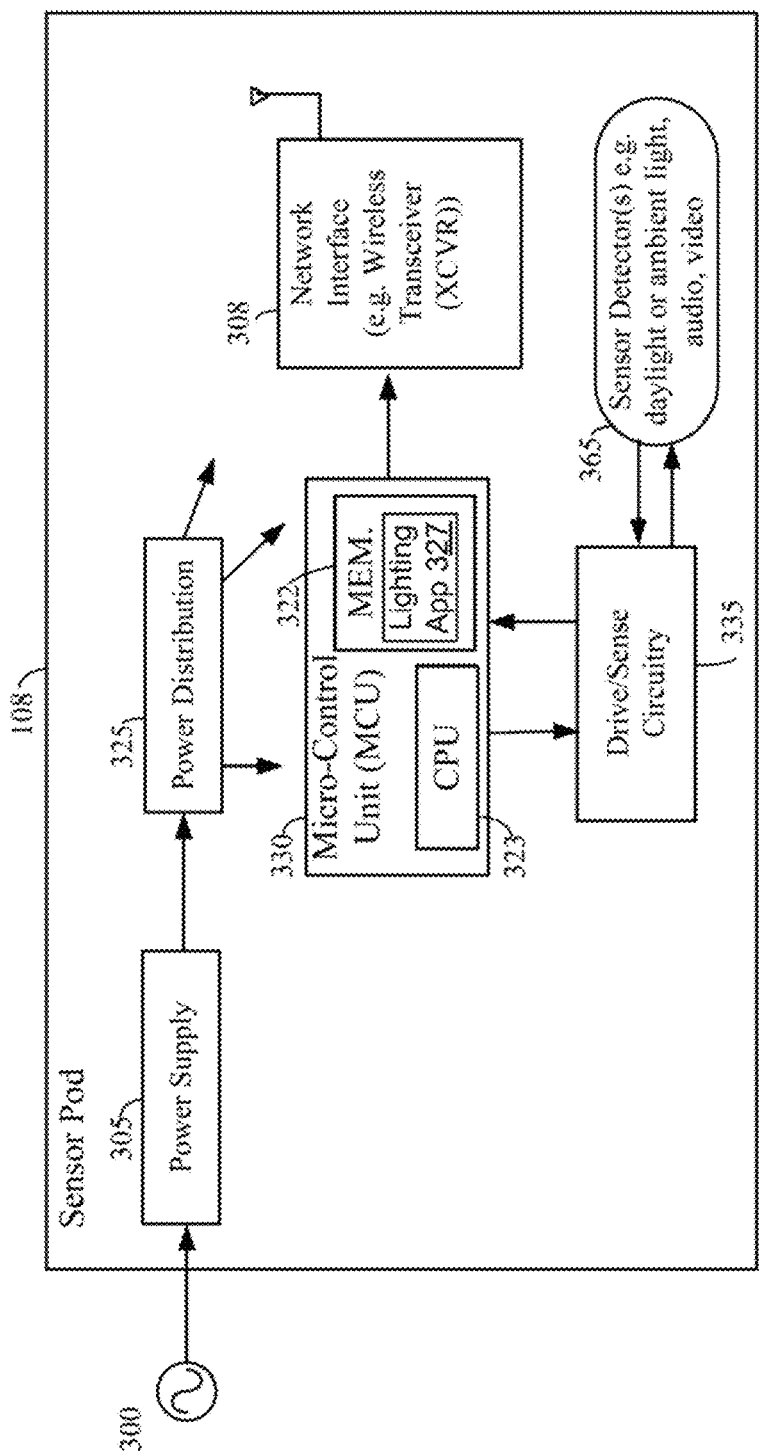
FIG. 3A is a block diagram of a sensor pod element that operates in and communicates via the lighting system of FIG. 1.

FIG. 3A is a block diagram of a sensor pod element 108 that operates in and communicates via the lighting system 102 of FIG. 1. The sensor pod 108 is an integrated sensor detector that generally includes a power supply 305 driven by a power source 300. Power supply 305 receives power from the power source 300, such as an AC mains, battery, solar panel, or any other AC or DC source. Power supply 305 may include a magnetic transformer, electronic transformer, switching converter, rectifier, or any other similar type of circuit to convert an input power signal into a power signal suitable for the sensor pod 108.

The sensor pod 108 includes power distribution circuitry 325 and a micro-control unit (MCU) 330. As illustrated, MCU 330 includes a memory 322 (volatile and non-volatile) and a central processing unit (CPU) 323. The memory 322 stores programming for execution by the CPU 323 of the micro-control unit and data that is available to be processed or has been processed by the CPU 223. The memory 322, for example, may include a lighting application 327 (which can be firmware/software) for occupancy counting, and lighting control operations. The power distribution circuitry 325 distributes power and ground voltages to the MCU 330, and wireless transceiver 308 to provide reliable operation of the various circuitry on the sensor pod 108.

The sensor pod 108 includes drive/sense circuitry 335, such as application firmware, that drive sensors within the sensor pod 108, for example, the occupancy, daylight, audio, and photo sensor, and hardware. The drive/sense circuitry 335 can detect state changes (such as change of occupancy (present or not present), audio, temperature, or daylight using sensors or detectors 365 such as passive infrared (PIR) and active infrared, thermal, sound, light, vibration, or other environment-related sensors. Sensors 365 may be based on, for example, Acuity Brands Lighting's commercially available xPoint™ Wireless ES7 product.

Figure 3B:
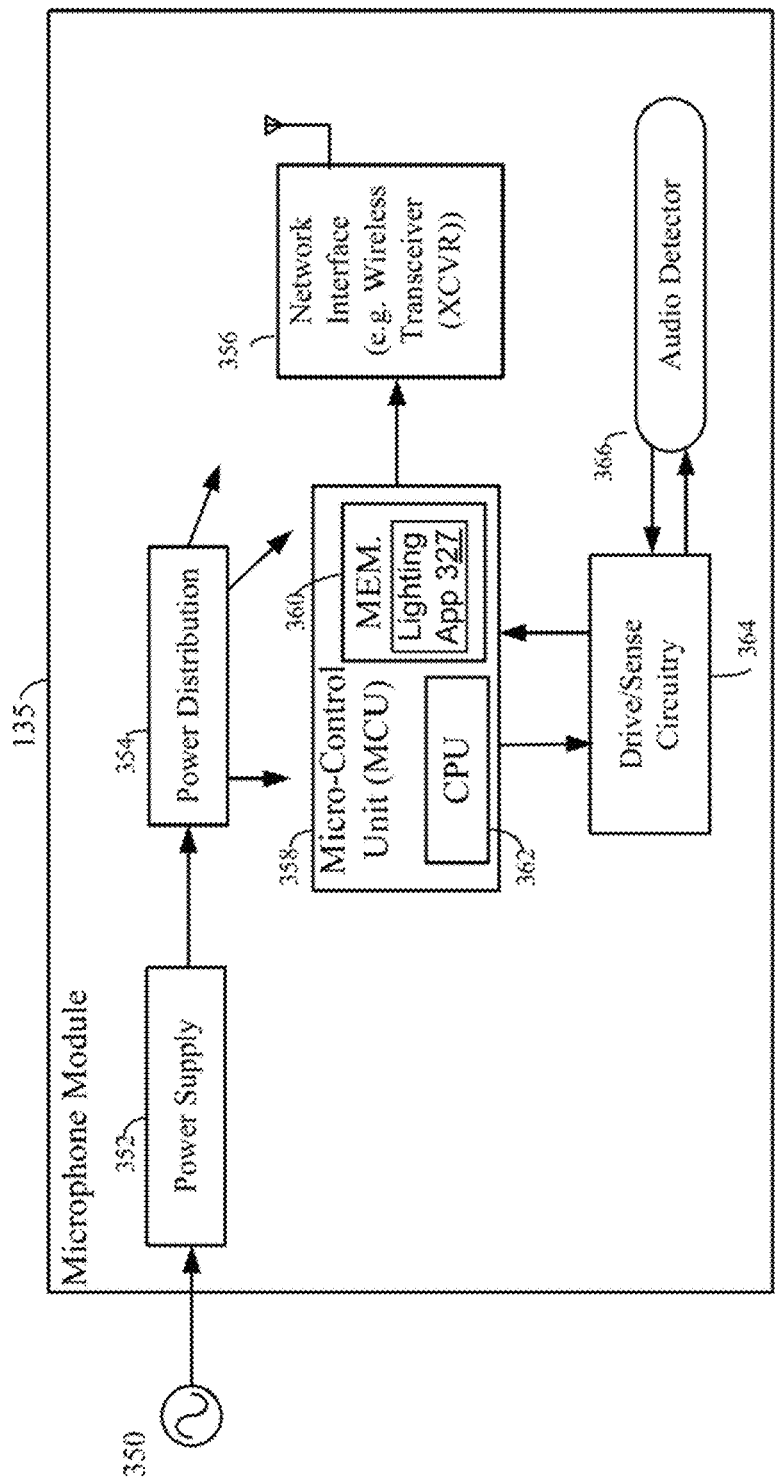
FIG. 3B is a block diagram of a microphone module that operates in and communicates with the lighting control device of the light fixture in the lighting system of FIG. 1.

FIG. 3B is a block diagram of a microphone module that operates in and communicates with the lighting control device of the light fixture in the lighting system of FIG. 1. Microphone 135 may be configured within the light fixture 104 or arranged to be accessible to the light fixture 104 and control/XCVR module 215. Any type of microphone configured to detect audio user input activity, for example, for speech recognition of verbal commands or the like, may be used; and some other types of sensors may be used if they provide adequate response to audio input. The microphone 135 of FIG. 3B may be a digital or analog type, and generally includes a power supply 352 driven by a power source 350. Power supply 352 receives power from the power source 350, such as an AC mains, battery, solar panel, or any other AC or DC source. Power supply 352 may include a magnetic transformer, electronic transformer, switching converter, rectifier, or any other similar type of circuit to convert an input power signal into a power signal suitable for the microphone 135.

The microphone 135 includes power distribution circuitry 354 and a micro-control unit (MCU) 358. As illustrated, MCU 358 includes a memory 360 (volatile and non-volatile) and a central processing unit (CPU) 362. The memory 360 stores programming for execution by the CPU 362 of the micro-control unit 358 and data that is available to be processed or has been processed by the CPU 362. The memory 360, for example, may include a lighting application 327 (which can be firmware/software) for occupancy counting, and lighting control operations. The power distribution circuitry 354 distributes power and ground voltages to the MCU 358, and wireless transceiver 356 to provide reliable operation of the various circuitry in the microphone 135.

The microphone 135 further includes drive/sense circuitry 364, such as application firmware, that drives audio detectors 366. The audio detectors 366 can detect sound within the area of the light fixture. The detected sound is transmitted to the drive/sense circuitry 364 and processed using the lighting app 327 and CPU 362.

Figure 4:
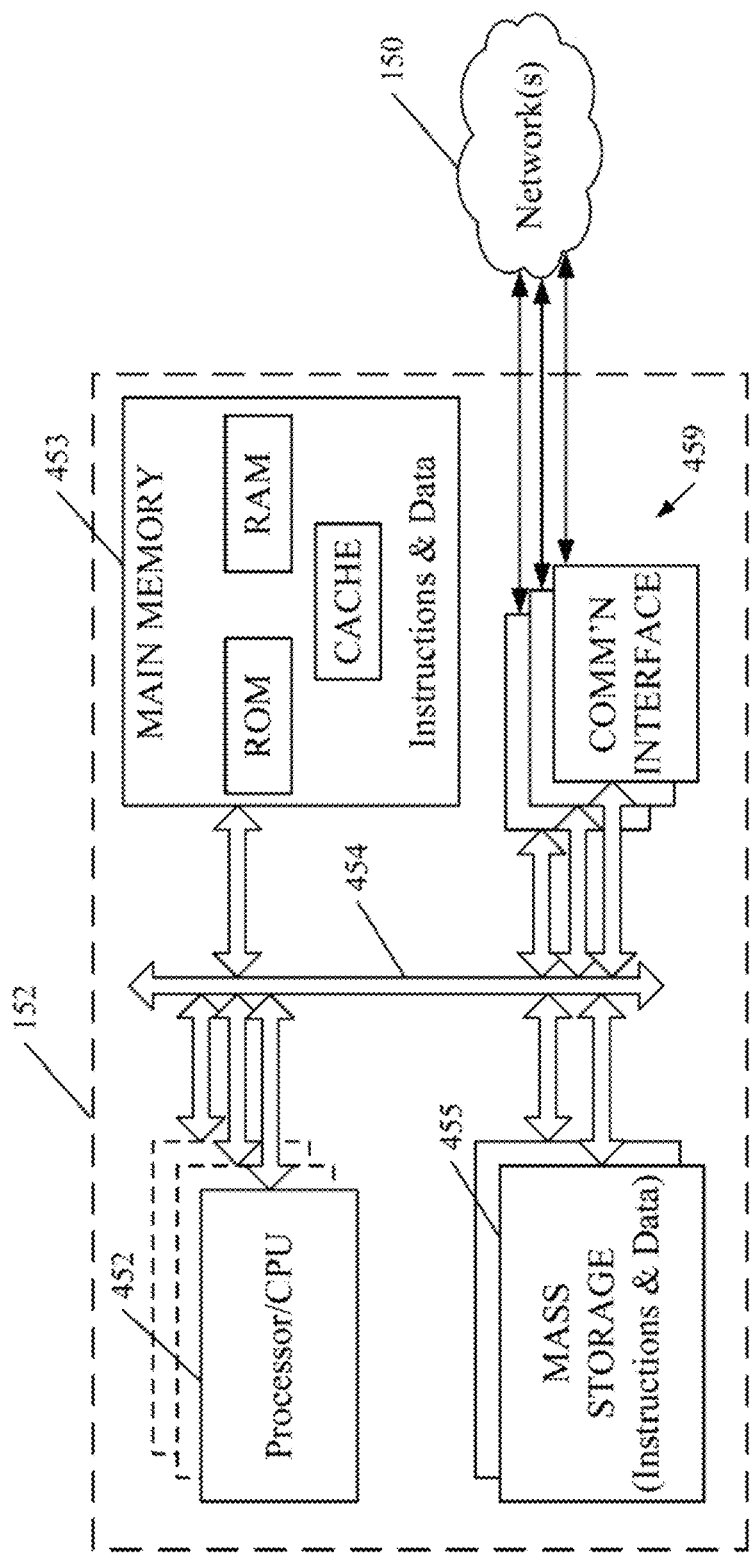
FIG. 4 is a simplified functional block diagram of a computer that may be configured as a host or server, for example, to function as the gateway or server in the system of FIG. 1.

FIG. 4 is a simplified functional block diagram of a computer that may be configured as a host or server, for example, to function as the gateway 152 or server in the system of FIG. 1 or the like.

The example 152 will generally be described as an implementation of a server computer. Alternatively, the computer system may comprise a mainframe or other type of host computer system capable of web-based communications, media content distribution, or the like via the network 150.

The computer system 152 in the example includes a central processing unit (CPU) 452, a main memory 453, mass storage 455 and an interconnect bus 454. The circuitry forming the CPU 452 may contain a single microprocessor, or a number of microprocessors for configuring the computer system 152 as a multi-processor system, or may use a higher speed processing architecture. The main memory 453 in the example includes ROM, RAM and cache memory; although other memory devices may be added or substituted. Although semiconductor memory may be used in the mass storage device 455, magnetic type devices (tape or disks) and optical disk devices typically provide higher volume storage in host computer or server application. In operation, the main memory 553 stores at least portions of instructions and data for execution by the CPU 452, although instructions and data are moved between memory and storage and CPU via the interconnect bus 454.

The system 152 also includes one or more input/output interfaces for communications, shown by way of example as interfaces 459 for data communications via the network 150. Each interface 459 may be a high-speed modem, an Ethernet (optical, cable or wireless) card or any other appropriate data communications device.

The computer system 152 runs a variety of applications programs and stores the necessary information for support of the occupancy detection and people counting described herein. One or more such application enable the delivery of web pages and/or the generation of email messages. Those skilled in the art will recognize that the computer system 152 may run other programs and/or host other web-based or email based services. As such, the system 152 need not sit idle while waiting for occupancy detection and people counting functions. In some application, the same equipment may offer other services.

In an example, the lighting system 102 is installed at a building premises. The system 102 also includes a data communication or wireless controller network 150 that interconnects the links to/from the network communication interfaces of the light fixture 104, microphone 135 and sensor pod 108 so as to provide data communications amongst the light fixtures 104A-104N. The data communication network 150 may support data communication by equipment at the premises via wired (e.g. cable or fiber) media or via wireless (e.g. WiFi, Bluetooth, Ethernet, RS485, ZigBee, Z-wave, etc.) or combinations of wired and wireless technology. Such a data communication network 150, for example a short range or local area network (LAN), also is configured to provide data communications for at least some of the light fixtures 104A-104N and other equipment at the premises, including the illustrated sensor pod 108 and microphone 135 (digital or analog) via a data network 155 outside the premises, shown by way of example as a wide area network (WAN), so as to allow the light fixtures 104A-104N, the microphone 135 and the sensor pod 108 at the premises to communicate with outside devices such as the server/host computer 105 and the user terminal device 106.

Figure 5A:
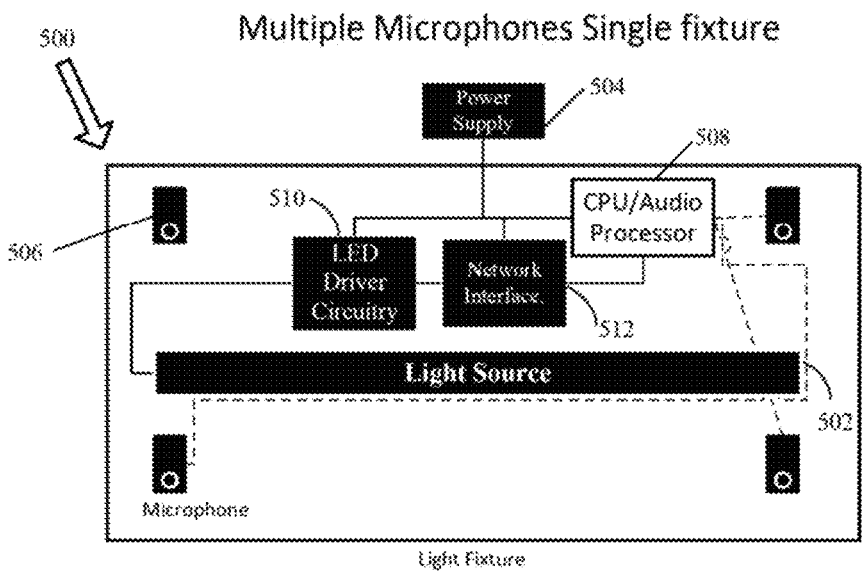
FIGS. 5A and 5B are exemplary configurations of microphones within a light fixture of FIG. 1.
Figure 5B:
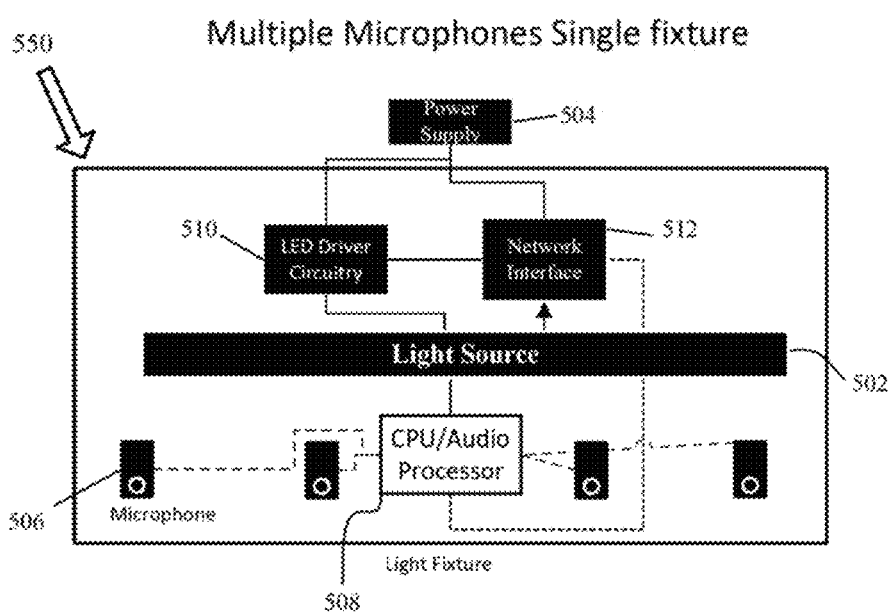

FIGS. 5A and 5B are examples of configurations of a light fixture 104 of FIG. 1 having an array of microphones within the light fixture.

In FIG. 5A, a plurality of microphones 506 are arranged within the light fixture 500, for example, as an array at corners of the light fixture 500. The light fixture 500 receives power from a power supply 504, and includes a CPU/audio processor 508 configured to process data from the microphones 506, as well as data received from the LED driver circuitry 510 that is used to control the light source 502. The plurality of microphones 506 may be digital or analog. When the microphones are analog, the CPU/audio processor 508 may further include an analog-to-digital converter to convert the analog sound signal detected within the area of the light fixture to a digital signal for further processing to determine an occupancy count. The light fixture 500 further includes a network interface 512 for wireless communication between the elements in the light fixture and within the system of FIG. 1. The functions of each of the LED driver circuitry 510, network interface 512, CPU/audio processor 508 and microphone 506 are similar to the elements described in detail above in FIGS. 2 and 3B.

In FIG. 5B, a plurality of microphones 506 are arranged within the light fixture 550 in a linear array. The light fixture 550 receives power from a power supply 504, and includes a CPU/audio processor 508 configured to process data from the microphones 506, as well as data received from the LED driver circuitry 510 that is used to control the light source 502. The plurality of microphones 506 may be digital or analog. When the microphones are analog, the CPU/audio processor 508 may further include an analog-to-digital converter to convert the analog sound signal detected within the area of the light fixture to a digital signal for further processing to determine an occupancy count. The light fixture 550 further includes a network interface 512 for wireless communication between the elements in the light fixture and within the system of FIG. 1. The functions of each of the LED driver circuitry 510, network interface 512, CPU/audio processor 508 and microphone 506 are similar to the elements described in detail above in FIGS. 2 and 3B.

One of ordinary skill in the art would recognize that the number of the microphones can be one or more than one, and arranged or accessible to the light fixture 500 and 550 in any additional shape, for example, circular, or diamond. For example, a plurality of microphones can be arranged in a single light fixture, a single microphone can be located in a single light fixture, or an array of microphones can be arranged in a plurality of light fixtures.

Figure 6:
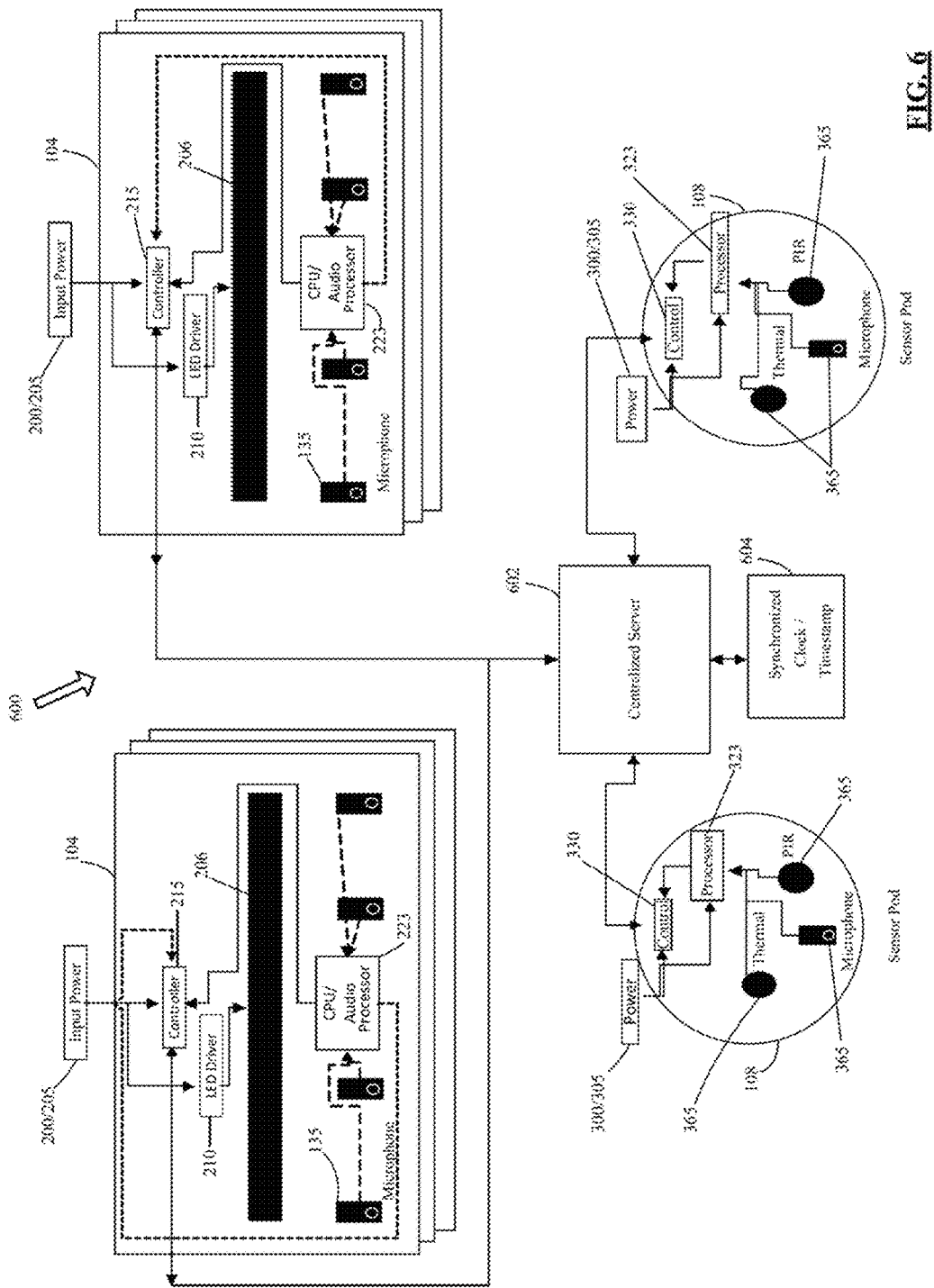
FIG. 6 is an example of the lighting system of FIG. 1 having a centralized server configuration.

FIG. 6 is an example of the devices of the lighting system 102 in FIG. 1 arranged in a centralized server configuration. As illustrated in FIG. 6, each of a plurality of light fixtures 104 includes, for example, four microphones arranged in a linear array. The light fixtures 104 are connected to a centralized server 602. The centralized server 602 functions similar to the gateway server 152, illustrated in FIG. 4, and engages in communication between the light fixture 104 and the sensor pod 108 through a network such as a wide area network (WAN) 150. The centralized server 602 may be located off premises and accessible via the WAN 150. The individual elements of the lighting system (e.g., LED driver 210, controller 215, light source 206, microphones 135, sensor pod 108, or processor 223) are similar to those described above in FIGS. 2, 3A and 3B; thus, the individual descriptions are not repeated here. Sensor pods 108 may also be connected to the centralized server 602. In an example, a sound is detected by the microphones 135 arranged in the light fixture 104. The detected sound is processed to determine a direction of the sound, and intensity level, and the results are recorded in a memory of the CPU/audio processor 223. The direction of the sound is determined by the position of the microphones in a given area, i.e., the position of the microphones within the frame, in pods around the room, or in multiple light fixtures. The sound is localized in, for example, two ways, using sound intensity and time. If, for example, there are four light fixtures in a room, one in each corner with one microphone each, the fixture which receives the highest sound intensity and receives the signal first, would be assumed as the closest to the sound. However, there may be situations in which a person could be facing (speaking in a direction of) one fixture, but physically closer to another. In this scenario, the volume may be lower at the closer light fixtures, and the time for the sound to have reached the microphone would be earlier. The localization fine tunes the direction of microphones in use. The intensity level is measured by the microphone and CPU/processor working in tandem where the microphone is a sensor that detects audio and provides the data to the processor which analyzes the data for a decibel level and frequency.

If the detected sound is determined by the CPU/processor to be human activity, for example, a sound having a frequency within a range of 100-4000 Hz for a human voice spectrum, then the recorded sound and data such as the direction and intensity level are transmitted from the light fixture 104 to the centralized server 602. The centralized server 602, processes the information from the multiple microphones 135 in the light fixtures 104, as well as timestamp information received from the synchronized clock/timestamp 604, to determine a number of occupants in the area of the light fixtures. The method of determining the number of occupants is discussed below. The synchronized clock/timestamp device 604 uses an internet timing protocol, for example, network time protocol (NTP) for clock synchronization between the devices and the centralized server in the system.

The sensor pods 108 may include a plurality of sensors 365, for example, a passive infrared (PIR) sensor configured to detect motion, a thermal sensor configured to detect a particular temperature or change in temperature, and an audio sensor such as a digital or analog microphone. The data detected from the plurality of sensors 365 in the sensor pod 108 can be used to augment the data obtained from the plurality of microphones 135 within the light fixtures 104. For example, when the sound(s) are detected by the microphones in the light fixture 103, there may also be a detection of activity by sensors in the sensor pod such as the PIR sensor 365 when there is motion, or the microphone 365 when there is audio detected. The data obtained by the sensors 365 of the sensor pod 108 is transmitted to the centralized server 602, which using the timestamp from the clock/timestamp device 604, can be used to corroborate or augment the determination of human activity and a number of occupants in the area of the light fixture 104 using a sensor fusion algorithm discussed below in FIG. 11.

Figure 7:
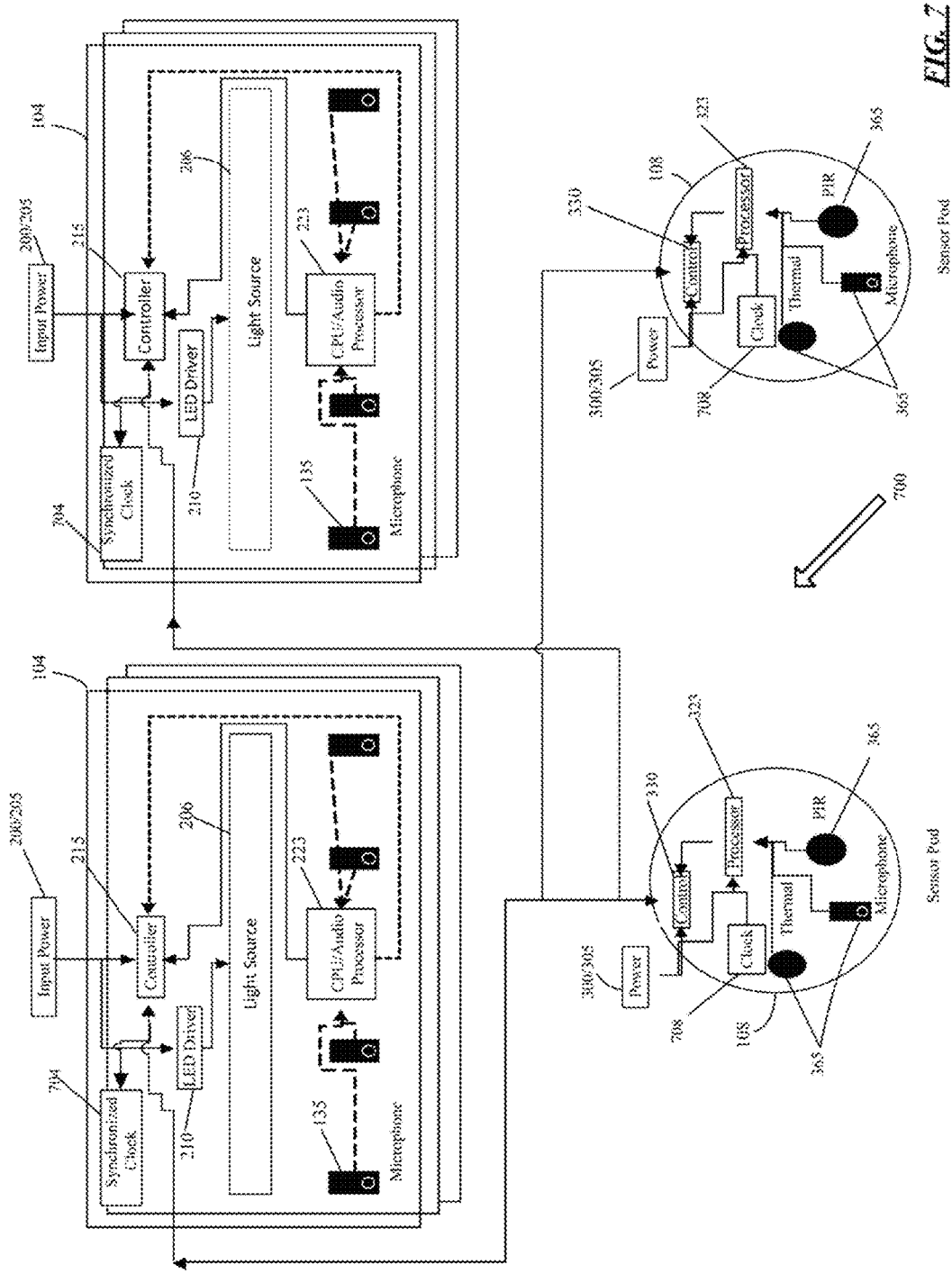
FIG. 7 is an example of the lighting system of FIG. 1 having a mesh configuration.

FIG. 7 is an example of the devices of the lighting system 102 of FIG. 1 arranged in a mesh configuration. The light fixture 104 and sensor pod 108 of the mesh configuration 700 illustrated in FIG. 7 function similarly to the centralized server configuration 600 described in FIG. 6, of which the individual device descriptions are described above in FIGS. 2, 3A and 3B. In FIG. 7, each of the plurality of light fixtures 104 includes, for example, four microphones 135 arranged in a linear array. As discussed above, the plurality of microphones could be alternately arranged within the light fixture, for example, in corners of the light fixture 104, in a circular pattern, or along each side of the light fixture 104. A mesh connection between the light fixtures 104 and the sensor pod 108 permits communication through network interfaces in each of the devices and a network such as a wide area network (WAN). A synchronized clock 704 is configured within each light fixture 104 and functions to provide a timestamp for synchronization of the data detected by the microphones 135, and processed and stored by the CPU/audio processor 223. The clock synchronization can be completed using a protocol or algorithm such as clock sampling mutual network synchronization (CS-MNS). In an example, sound in an area of the plurality of lights is detected by one or more of the microphones 135 within each of the plurality of light fixtures 104. The sound, as well as a direction and intensity level of the sound are processed by the CPU/audio processor 223, and recorded in a memory of the CPU/audio processor 223. The intensity level is determined by the raw microphone data, where the raw data is unaltered data that is detected or sensed by the microphone. The raw data from the microphone is processed by the CPU/audio processor. The direction of the sound is determined based upon intensity and timing between multiple microphones. If, for example, there are four light fixtures in a room, one in each corner with one microphone in each, the light fixture which receives the highest sound intensity and receives the signal first, would be assumed as the closest to the sound. If there is only a single microphone in an entire space, the only piece of information to be determined would be the intensity and frequency. To determine the direction of the sound detected by a single microphone, multiple separate devices, such as sensor devices within light fixtures or standalone pods, must be coordinated over a network. A timestamp for each detected and recorded sound is provided by the synchronized clock 704. If the detected sound is determined to be human activity based upon, for example, having a frequency within a range of 100 to 4000 Hz to indicate a human voice spectrum, then the recorded sound and data such as the direction and intensity level, or time of signal are processed by the CPU/audio processor to determine a number of occupants in the area of the light fixtures.

The sensor pod 108 may include a plurality of sensors 365, for example, a passive infrared (PIR) sensor configured to detect motion, a thermal sensor configured to detect a particular temperature or change in temperature, and an audio sensor such as a digital or analog microphone. The sensor pod may further include a clock 708 to provide a clock signal to the controller 330 and the processor 323. The data detected from the plurality of sensors 365 in the sensor pod 108 can be used to capture information regarding the environment of the area in which the plurality of lights 104 are located, and can be used to augment the data obtained from the plurality of microphones 135 within the light fixtures 104. For example, the sound(s) that are detected by one or more of the microphones 135 may also be detected by the microphone in the sensor pod 108 and the other environmental data such as motion or temperature obtained from the PIR or temperature sensors can be used to provide a more accurate analysis of the overall environment of the room. Other types of sensors to provide environmental data include, but are not limited to, humidity, $CO_2$, camera, and thermal cameras. The data obtained by the sensors 365 of the sensor pod 108 is transmitted to the CPU/audio processor 223, which using the timestamp from the synchronizing clock 704, can be used to corroborate or augment the determination of human activity and a number of occupants in the area of the light fixture 104 using a sensor fusion algorithm discussed below in FIG. 11.

Figure 8:
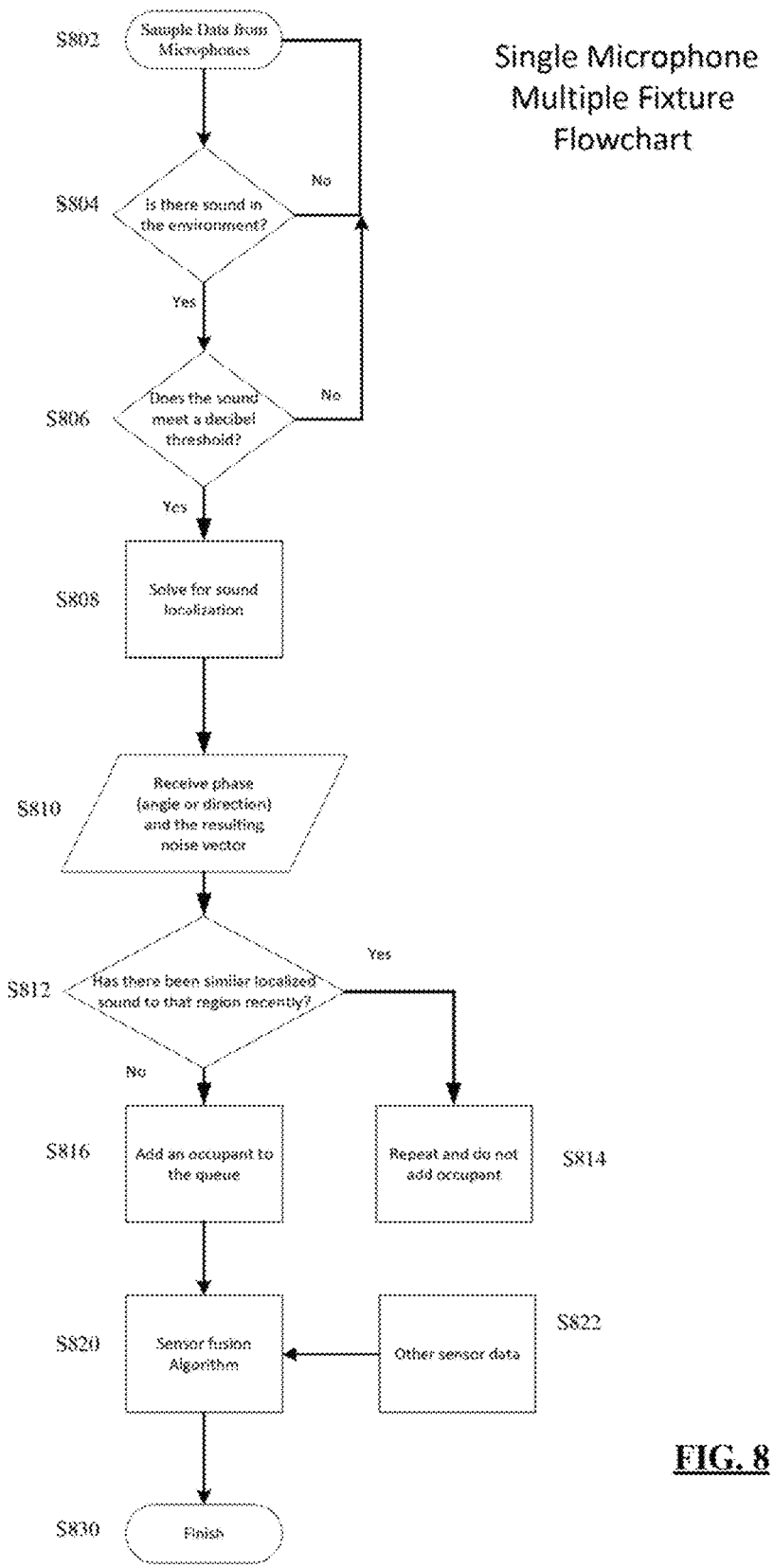
FIG. 8 illustrates an example of a method for counting occupants using sound localization in a system having a single microphone in each of multiple light fixtures.

FIG. 8 illustrates an example of a method for counting occupants using sound localization in a system having a single microphone in each of multiple light fixtures. In the flowchart of FIG. 8, a single microphone is located within each light fixture or accessible to multiple light fixtures. Utilizing a microphone that is accessible to each of the multiple light fixtures described herein, a number of occupants in an area of the light fixtures can be determined based upon an analysis of the detected sound where a direction and intensity from which the sound is detected is interpreted as a location of an occupant.

Beginning at S802, a microphone that may be a digital or analog type, and is arranged within each light fixture or accessible to a plurality of light fixtures arranged within a premises or an area, is powered on to sample sound within the area. The sound is continuously sampled and, at S804, the data from the samplings is analyzed to determine whether sound indicative of human activity, for example, within a human voice spectrum of 100-4000 Hz or a sound level within a decibel range of 50-100 dB, is detected in the area. The sampled data from the microphone is digitally represented as pulse code modulated/pulse density modulation (PCM/PDM) data when the microphone is digital. If the microphone is analog, then it would be necessary for the light fixture to further include an analog to digital (AD)

converter to convert the analog signal from the microphone to a digital signal for further processing. If no sound indicative of human activity is detected at S804, the sampling continues at S802. If a sound indicative of human activity is detected at S804, then at S806, a sound level of the sampled data is analyzed to determine whether the intensity of the sound, a decibel threshold level for human conversation, or whether there are any spikes in the sound. For example, a spike in the sound or data having a level within a decibel range of 50 to 100 dB could indicate human activity or the sound of a person speaking. The decibel threshold level may be dependent upon a size of the area in which the light fixtures are arranged. If, at S806, the sampled sound data does not meet a predetermined decibel threshold level, for example 50 to 100 dB, then sampling for sound in the area continues at S802. If the sound data meets the predetermined decibel threshold level, then the process continues to S808.

At S808, a sound localization algorithm is used to determine location information of, for example, the sampled sound data of a human voice, detected by the microphone that is accessible to each of the plurality of light fixtures. The sound localization algorithm calculations include analyzing a direction from which the sound was detected by the microphone to determine a time and frequency of the sound in the area. A comparison is made between the time and frequency information obtained from the sampled data, as well as the intensity of the sound to determine an order of reception in which the sound reached the microphone to create a noise vector for each sample, where the order of reception can be perceived as the louder sound arriving first and within the frequency range of, for example, a human voice, as well as being closer to a source of the sound. An occupancy counter is incremented for each noise vector. After, in S808, the sound localization algorithm is completed for the single microphone accessible to each of multiple light fixtures in the area, the process continues to S810.

At S810, the time and frequency information, along with the noise vector stored in a memory during the sound localization algorithm, are received. At S812, the time and frequency information, and the noise vector information stored in the memory are compared with other information stored in the memory to determine whether there has been a matching localized sound within the area within a predetermined time period, for example, 5-15 seconds. If at S812, the data stored in the memory is the same within the predetermined time period, then the occupant counter is not incremented, and memory is checked for each additional sampled sound data. If at S812, the received data is not the same as the time and frequency localized data stored in the memory within the predetermined time period, then at S816, the occupant counter is incremented, and the process continues to S820.

Figure 11:
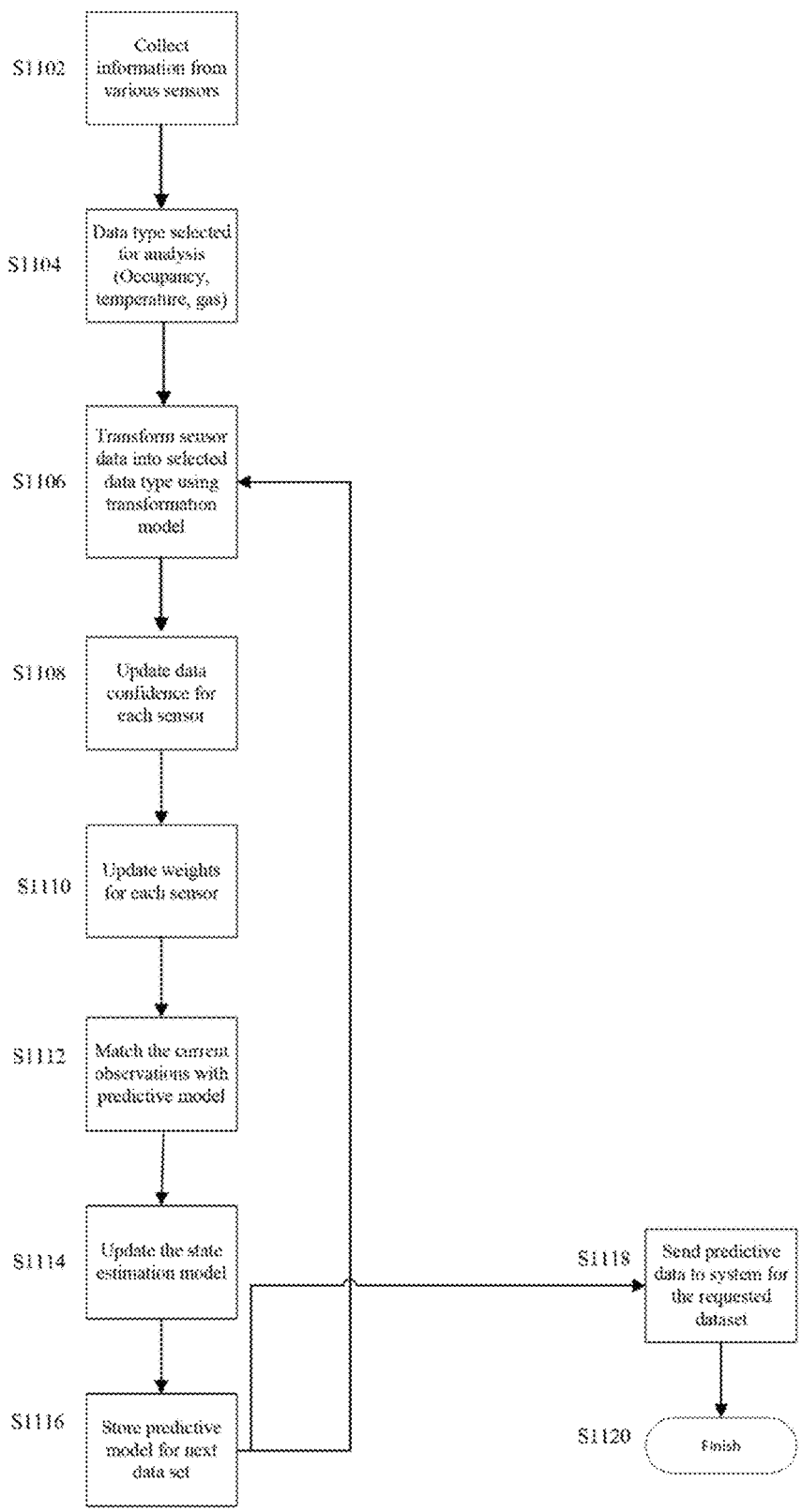
FIG. 11 illustrates a sensor fusion algorithm used in the method of counting occupants.

At S820, a sensor fusion algorithm is used to augment or corroborate the sound data received from each microphone accessible to the multiple light fixtures. FIG. 11 illustrates the process steps of the sensor fusion algorithm. At S822, data from the sensors in the sensor pod, described above, or any additional sensors that may be co-located in the multiple light fixtures is processed using the sensor fusion algorithm of S820. For example, the multiple light fixtures may have a temperature sensor, light intensity sensor, PIR configured to detect motion, thermal sensor configured to detect a particular temperature or change in temperature, etc. similar to those described above for the sensor pods 108. The data captured by the plurality of sensors provides information regarding the environment of the area in which the plurality of lights are located. For example, the human activity detected by sound captured by one or more of the microphones 135 may also be detected by motion in the area with a PIR sensor, temperature changes with a temperature sensor or thermal sensor, or sensors to detect changes in $CO_2$ or humidity levels.

During implementation of the sensor fusion algorithm of FIG. 11, at S1102, environmental data from the various sensors arranged within the plurality of light fixtures or within a sensor pod that is accessible to the plurality of light fixtures is received by a processor. At S1104, the actual, raw (unprocessed) data received by the processor from the various sensors is organized into data types for analysis, for example, temperature, voice, animal, light, machine, scents, occupancy, etc. For example, a CO2 sensor measures CO2 concentration in the area for a time period. At S1106, an analysis is performed on the organized types of data to determine a prior occurrence or history of the data from devices within the sensor pod to transform the sensor data into the selected data type in S1104. The sensor data is transformed using a transformation model which is a mathematical function used to predict a number of people in a given room/environment for a sensor calibrated for variable in the room such as HVAC, open doors, active CO2 sources, etc. The mathematical model can evolve to become more accurate and reject, using machine learning, data that may be too erroneous. During initial and early operation of the sensor devices within the system, there would be little to no historical data for comparison. To remedy a lack of historical sensor data, for example, relevant sensor data for the types of sensors included in the sensor pod or used within the area could be pre-loaded during installation of the system within the area.

At S1108, when the transformation analysis of S1106 is completed, a data confidence level for data from each sensor within the sensor pod is updated based upon having a value or pattern of a prior occurrence or history, i.e., within an expected value or range, or how accurate has data from the sensor been with respect to prior predictions. The data confidence level for each sensor indicates the reliability of the observation or data from the sensor where a lower confidence level indicates lower reliability.

At S1110, the weights for each sensor are updated. The confidence level of S1108 may effect weights assigned to each sensor. Weights are assigned to each observation, for example, the observed data type for each sensor, using a weight function so as to provide outputs that are heavily influenced by parameters that have more weight, and less influenced by parameters with lower weight. The weight is a fractional value, where all the possibilities add up to 100. In an example, an occupancy level may have four (4) states such as: no people, low, medium and high occupancy. Based on sensor values of high room temperature, high CO2, and loud noise, a weight for "high" occupancy would be assigned 90%.

At S1112, the results of the historical analysis are compared to the time, intensity, and voice frequency information that were stored in the memory for the localization (FIG. 10) of the data received by the microphone located within the light fixtures or accessible to each of the multiple light fixtures. At S1114, if the result of the historical analysis enhances or alters the results that were stored in memory, e.g. the historical analysis is enough to change whether the occupancy counter should have been incremented or not, a state estimation model of the data type is updated. The state estimation model is updated iteratively so the output of the model approaches the ground-truth (actual number of occupants). In other words, the system may start with a generic state estimation model and low accuracy. As new observations are made, compelling patterns appear. Hence, the state estimation model needs to be updated to stay true to the patterns revealed by the observations producing the correct output. In particular, the update is used to form a consensus of the results of observations from multiple sensors. For example, given sensor A with a result of 10, sensor B with a result of 8, and sensor C with a result of 14, the objective would be to have a consensus on an estimated number based on the weights applied to the sensors from the historical analysis.

At S1116, the analyzed data is stored for use as a predictive model for any next data set analysis at S1106. At S1118, the results of the comparison at S1112 are transmitted to the requesting system. The requesting system may be an occupancy detecting and counting system, an HVAC system, etc. The requesting system could use the data to determine, for example, how to adjust the HVAC system or lighting based upon the number or occupants in the area. The algorithm is finished at S1120.

After the sensor fusion algorithm of S820 is complete, the method of counting occupants using sound localization in a system having a single microphone accessible to each of a plurality of light fixtures is finished at S830.

Figure 9A:
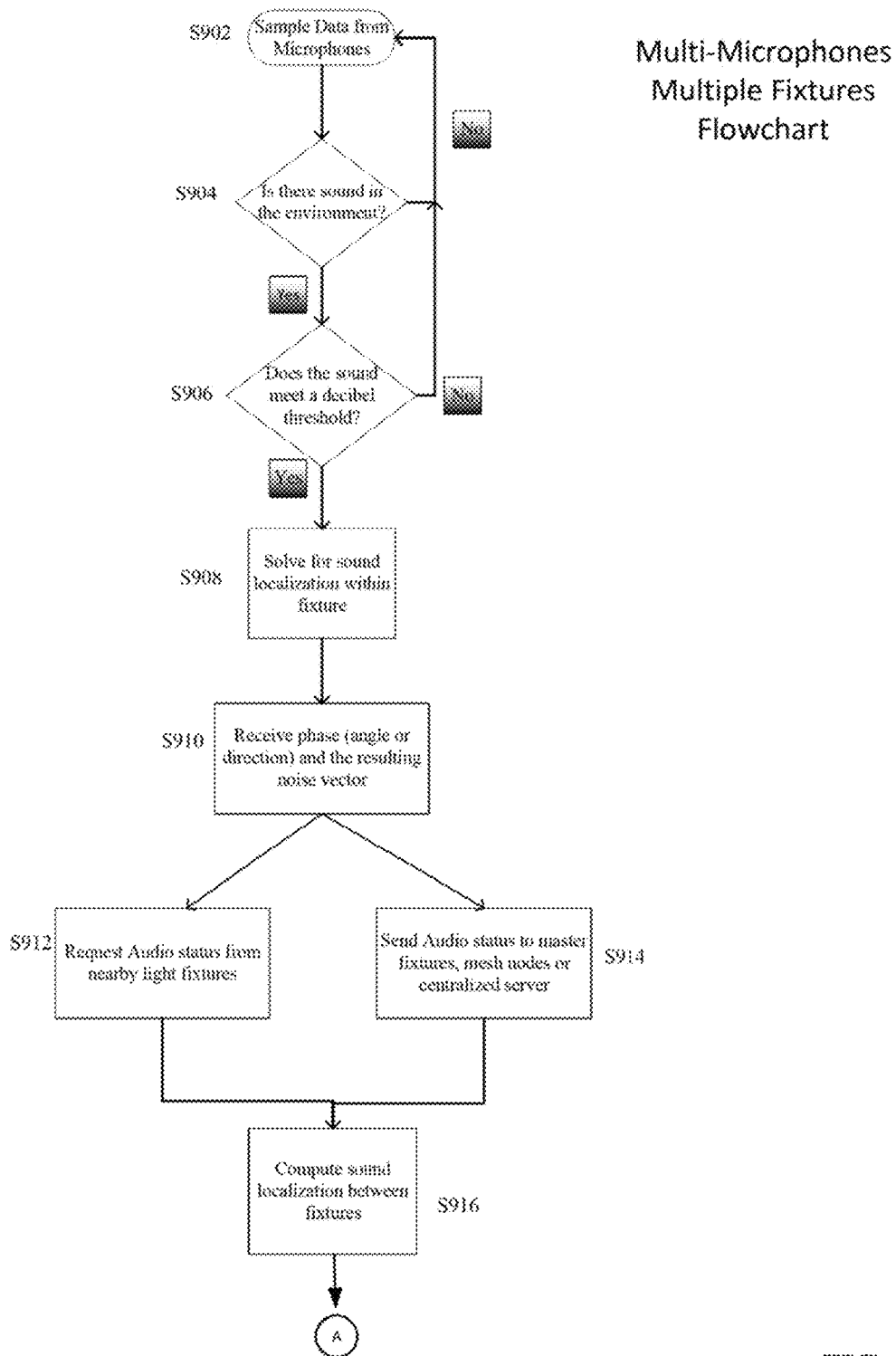
FIGS. 9A and 9B illustrate another example of a method for counting occupants using sound localization in a system having a plurality of microphones in each of multiple light fixtures.
Figure 9B:
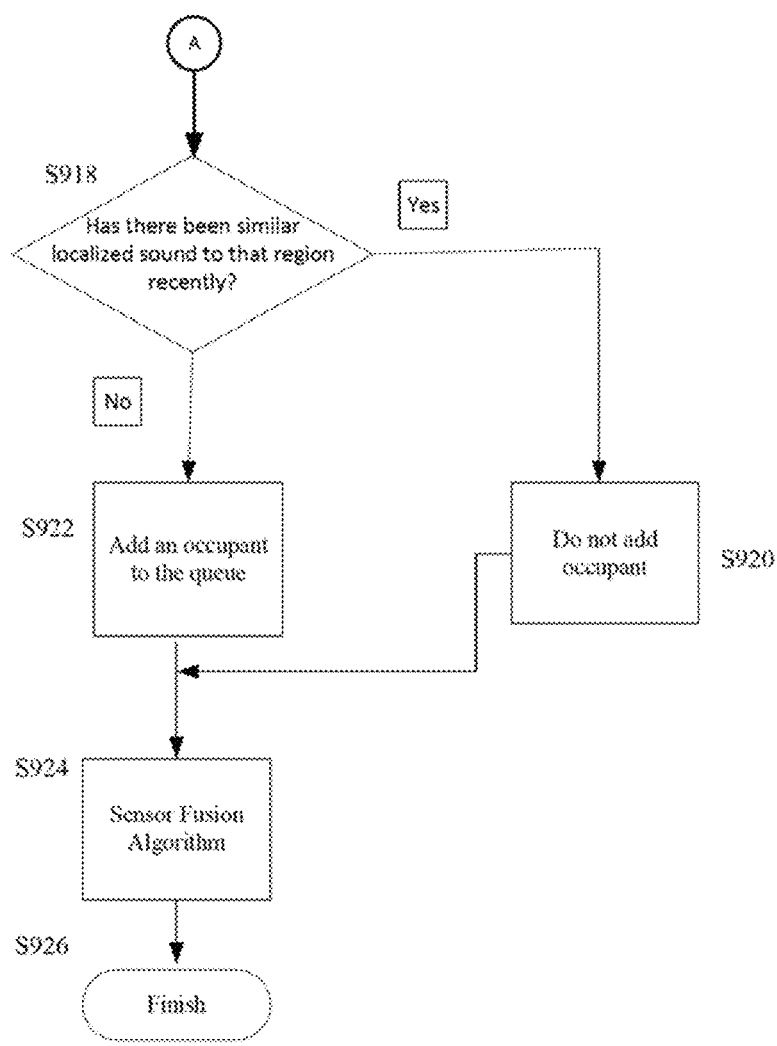

FIGS. 9A and 9B illustrate an example of a method for counting occupants using sound localization in which multiple microphones are accessible to each of a plurality of light fixtures. Utilizing multiple microphones that are located within or accessible to the plurality of light fixtures described herein, a number of occupants in an area of the multiple light fixtures can be determined based upon an analysis of the detected sound where a direction from which the sound is detected is interpreted as the location of an occupant.

Beginning at S902, a plurality of microphones that may be digital or analog type, and are accessible to multiple light fixtures arranged within a premise or an area, are powered ON to sample sound within the area. The plurality of microphones may be arranged such that an array of the microphones is located within each of the multiple light fixtures. The array of microphones, as described herein, may be any pattern, for example, linear, circular, or at corners of the light fixtures. The area is continuously sampled for sound and, at S904, the data from the samplings is analyzed to determine whether sound indicative of human activity, for example, within a human voice spectrum of 100-4000 Hz or a sound level within a decibel range of 50-100 dB, is detected in the area. The sampled data from the microphones is digitally represented as pulse code modulated/pulse density modulation (PCM/PDM) data when the microphones are digital. If the microphones are an analog type, then it would be necessary for the light fixtures to further include an analog to digital (AD) converter to convert the analog signal from the microphones to a digital signal for further processing. If no sound indicative of human activity is detected at S904, the sampling continues at S902. If a sound indicative of human activity is detected at S904, then at S906, a sound level of the sampled data is analyzed to determine whether the intensity of the sound is within a decibel threshold level for human conversation, or whether there are any spikes in the sound. For example, a spike in the sound or data having a level within a decibel range of 50 to 100 dB could indicate human activity or the sound of a person speaking. The decibel threshold level may be dependent upon a size of the area in which the light fixtures are arranged. If, at S906, the sampled sound data does not meet the predetermined decibel threshold level for a human voice, for example 50 to 100 dB, then the process of sampling for sound in the area continues at S902. If the sampled sound data meets the predetermined decibel threshold level, then the process continues to S908.

Figure 10:
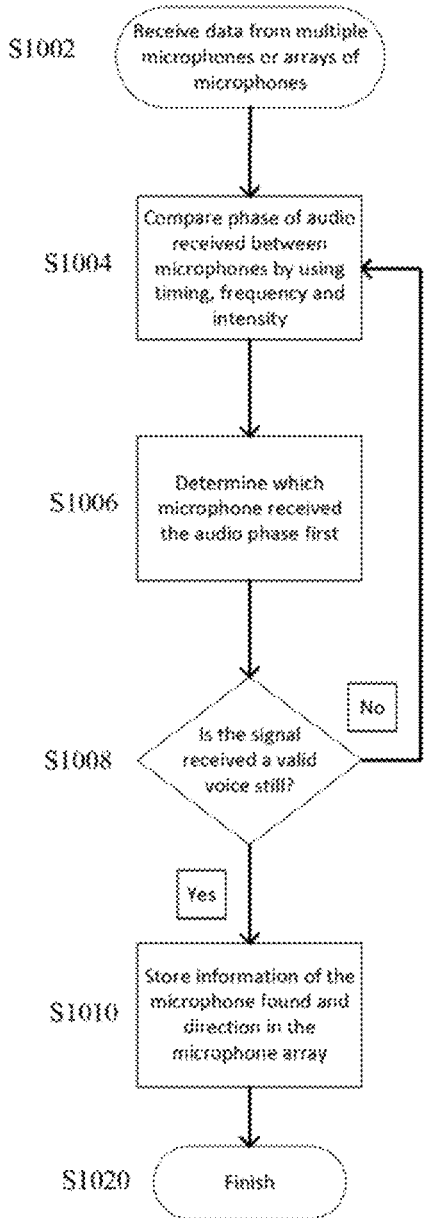
FIG. 10 illustrates a sound localization algorithm used in the method of counting occupants.

At S908, a sound localization algorithm, illustrated in FIG. 10, is used to determine location information of, for example, the sampled sound data of a human voice, detected by the microphones within or accessible to each of the plurality of light fixtures. The sound localization algorithm calculations include analyzing a direction from which the sound was detected by the microphones within or accessible to the plurality of light fixtures to determine a time and frequency of the sound in the area. A comparison is made between the time and frequency information obtained from the sampled data, as well as the intensity of the sound to determine an order of reception in which the sound reached the microphone to create a noise vector for each sample, where the order of reception can be perceived as the louder sound arriving first and within the frequency range of, for example, a human voice, as well as being closer to a source of the sound.

Beginning at S1002, the sampled data is received from each microphone or array of microphones within or accessible to each of the plurality of light fixtures. At S1004, a comparison is made of the phase or direction of the sampled sound data received between the microphones to provide time and frequency information of the sampled data. At S1006, the time and frequency information is analyzed along with an intensity level of the sound to determine an order of reception in which the sound reached the microphones, and to create a noise vector for each sample, wherein the order of reception can be perceived as the louder sound arriving first and within the frequency range of a human voice. At S1008, a determination is made of whether the sampled signal received is indicative of human activity, for example, a human voice based upon the sample being within a predetermined frequency range of, for example, 100-4000 Hz or a sound level within a decibel range of 50-100 dB. If the sampled signal is no longer within the predetermined frequency range, then the process returns to S1004 to compare the phase and direction of any additional sound samples from microphones within the plurality of light fixtures. If the sample signal is within the predetermined frequency for a human voice or activity, then at S1010, the location information regarding which of the microphones received the sound first, intensity and direction of the sound are stored in a memory. After the information is stored in the memory, the process of sound localization for the plurality of microphones within each light fixture ends at S1020.

At S910, the results of running the sound localization algorithm for the plurality of microphones in the multiple light fixtures, e.g., the time, frequency, intensity, and noise vector information, are received by the lighting control device similar to that described in FIG. 2 herein. Additionally, within each fixture or sensor pod, data such as presence, frequency, intensity, and a timestamp is transmitted between the devices. The localized direction for multiple microphone devices is kept local, which allows then allows the different devices to localize between each other. At S912, a request is made for the audio status from nearby light fixtures. The audio status may include, for example, whether sound is heard and type, sound localized to a given area, and whether occupants are detected. At S914, the audio status requested at S912 is transmitted to, for example, master fixtures, for example, a gateway, mesh nodes, a centralized server, or a combination thereof. Based on the system configuration, whether gateway, mesh, centralized server or a mix of a number of these, the flow of data information and the audio status will be different. For example, in a mesh configuration, most if not all of the nodes will have data flowing through. If the configuration is a local master or gateway, the master will receive all the sensor status of the sensor pod or light fixture and coordinate the data locally. In a centralized server configuration, data will be forwarded to a backend for analysis and coordination of the audio similar to the process used for the local configuration.

At S916, the results of the sound localization algorithm are used to analyze a direction from which the sound is detected as between the plurality of light fixtures, wherein the results of the initial sound localization at S908 provided a direction of the sound with respect to the plurality of microphones within the same light fixture. FIG. 10 illustrates implementation of the sound localization algorithm, and is similar to the description above for S908 with the exception that the calculation for the localization analyzes the sound between the multiple light fixtures. In particular, each light fixture generates an audio status indicating for example, what type of sound was detected and the vector in the direction of the sound source. The computation of the sound localization between the light fixtures uses all the vectors from each of the light fixtures to localize where the sound source is in a 3D space, i.e. triangulate the location of the sound source. The process of sound localization between each light fixture ends at S1020 and the process continues to S918.

At S918, an analysis is performed to determine whether there has been a matching localized sound within the area within a predetermined time period, for example, 60 minutes. If at S918, there has been no matching sound within the predetermined time period, then an occupancy counter is incremented. If at S918, there has been a matching localized sound to the region within the predetermined period of time, then the occupancy counter is not incremented. The process continues to S924.

At S924, the sensor fusion algorithm is implemented, as illustrated in FIG. 11 and described herein with respect to FIG. 8, which illustrated occupancy counting in a system having a single microphone in each of multiple light fixtures. As discussed above, the sensor fusion algorithm is used to augment or corroborate the sound data received from each microphone or array of microphones accessible to the multiple light fixtures. The data captured by the plurality of sensors provides information regarding, for example, the environment of the area in which the plurality of lights are located.

After the sensor fusion algorithm is completed, the process ends at S926.

Figure 12A:
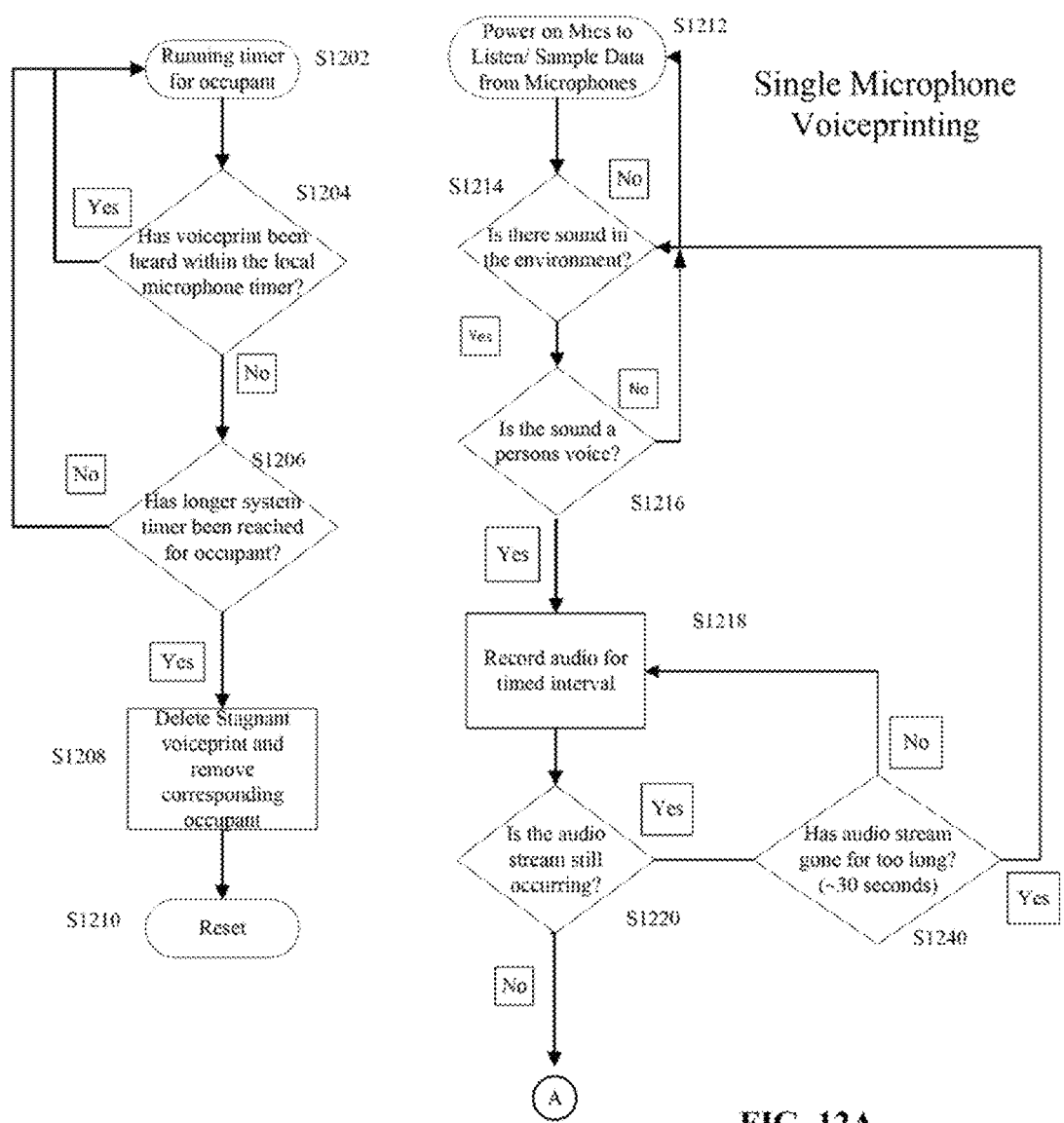
FIGS. 12A and 12B illustrate an example of a method for counting occupants using voiceprinting in a system having a single microphone in each of multiple light fixtures in an area.
Figure 12B:
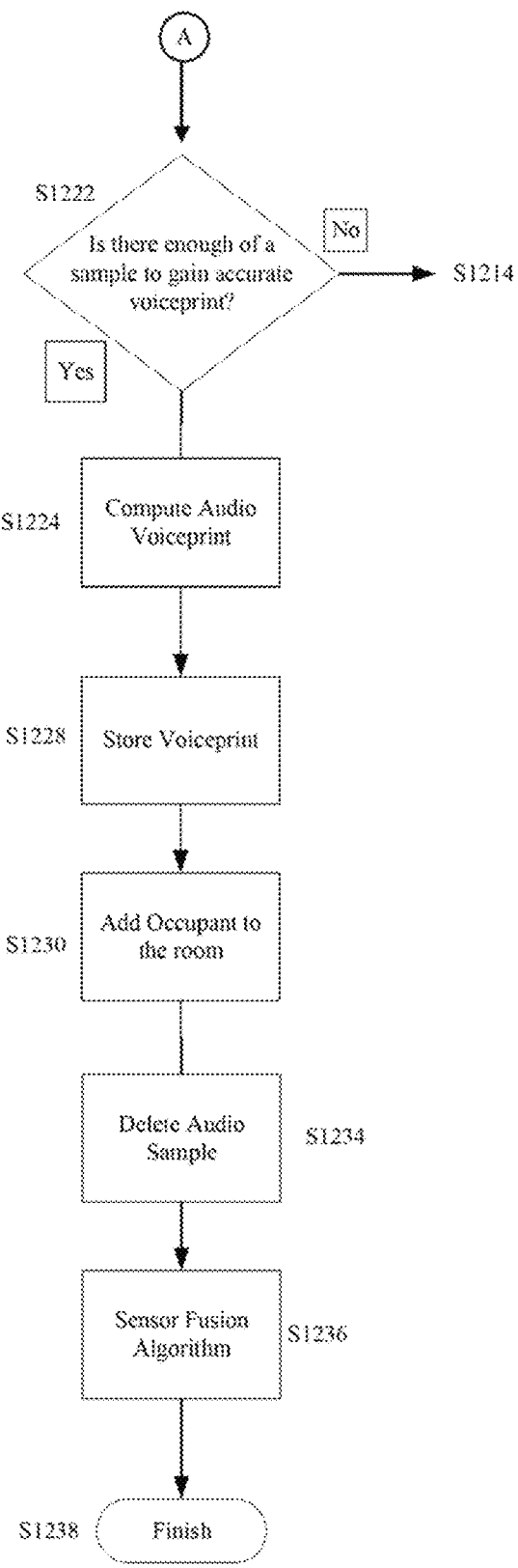

FIGS. 12A and 12B illustrate an example of a method for counting occupants using voiceprinting in a system having a single microphone in each of a plurality of light fixtures in an area. In the flowchart of FIGS. 12A and 12B, a single microphone is accessible to a plurality of light fixtures in an area. Utilizing the microphone that is located within or accessible to the light fixtures, a number of occupants in an area of the light fixtures can be determined based upon an analysis of the detected sound and creation of a corresponding voiceprint, where the voiceprint is a set of measurable characteristics of a human voice that uniquely identifies an individual, and where a direction from which the sound is detected is interpreted as a location of an occupant.

Beginning at S1212, a microphone that may be digital or analog type, and is accessible to the plurality of light fixtures arranged within a premises or an area is powered on to listen or sample for sound within the area. During the listening or sampling for sound, the processor in the light fixtures temporarily records audio to obtain sound data from the area. The temporary recording is stored in a memory of the light fixtures. The microphone continuously listens in short increments of less than one second for sound within the area, and at S1214, the temporarily recorded data from the listening or sampling is analyzed to determine whether sound indicative of human activity, for example, a human voice within the predetermine voice frequency spectrum, is detected in the area. The sampled data from the microphone is digitally represented as, for example, pulse code modulated/pulse density modulation (PCM/PDM) data when the microphone is digital. When the microphone is an analog type, then it would be necessary for the light fixtures, for example, to further include an analog to digital (AD) converter to convert the analog signal from the microphone to a digital signal for processing and analysis. At S1214, if no sound indicative of human activity is detected, the microphone continues to listen or sample for sound in the area at S1212. The previously recorded temporary data is deleted to maintain memory space for continued sampling.

If a sound indicative of human activity is detected in the environment at S1214, then at S1216, an analysis is made to determine whether the detected sound is a human voice. The analysis includes a general frequency analysis to determine whether the detected sound is within a frequency range of, for example, 100-4000 Hz or a sound level within 50-100 dB. If the detected sound is determined to not be a human voice, then the process returns to S1212 for continued listening or sampling for sound in the area. If the detected sound is a human voice, the process continues to S1218, and the temporary recording of the sampled data is deleted.

At S1218, the processor of the light fixtures records the detected human voice, for example, 5-15 seconds, to create an audio sample of the detected human voice that is stored in the memory. At S1220, after the 5-15 seconds, a check is made to determine whether there is still a human voice continuing in the area, whether the same voice from the recorded sample or a new voice. If there is a continuing human voice, then at S1240, the audio is permitted to continue to record for an additional 10-25 seconds at S1218, for example, such that the total recorded stream would be less than about 30 seconds. If at S1240, the audio stream continues longer than, for example, 30 seconds, then the process continues to S1214. In general, an audio sample is recorded for as long as there is a continued stream of audio in the area. When there is no audio stream in the area, the process continues to S1222.

In FIG. 12B, at S1222, a determination as to whether the audio sample recorded at S1218 contains enough data to create a voiceprint that can be used to uniquely identify a person who is the source of the voice in the area. To contain enough data, the audio sample must include a valid number of varied, spoken words. One of ordinary skill in the art would recognize this may be determined, for example, by speaking a repetitive statement such as "I went to the grocery store today" several times, or speaking a 3-4 sentence long paragraph. If a person only speaks a single, one syllable word, for example, "the," "no," or "yes," repetitively, it will not be enough to gain an accurate voiceprint because there would not be enough variation in voice inflection, tone or syncopation. If the audio sample does not contain enough data to obtain a voiceprint, then the process returns to S1214 to record additional audio for a timed interval. If the audio sample contains enough data to obtain a voiceprint, then the process continues to S1224.

At S1224, a voiceprint is created based upon the audio sample from S1218 and S1222. A voiceprinting algorithm may be used to calculate the voiceprint. In particular, because the audio sample was recorded in the time domain, the voiceprinting algorithm converts the audio sample to the frequency domain using, for example, a fast Fourier transform (FFT) to provide a spectrogram or visual representation of the specific frequencies of the audio sample. For each frequency in the computation space, there is an amplitude associated with it that gives a unique representation of the audio which is visible to humans. The spectrogram or voiceprint provides a source for comparison of voices that are in the area, with each voiceprint representing a different person in the area.

At S1228, once the voiceprint is created, the voiceprint is stored in the memory of the lighting control device of the light fixtures, and at S1230, an occupant counter is incremented to indicate the presence of a person in the area that corresponds to the voiceprint.

After the occupant counter is incremented at S1230, in FIG. 12A, S1202, a timer is started to set a time period to confirm whether the person whose voice matches the voiceprint is still present in the area. For example, the timer may be set for 60 minutes. One of ordinary skill would recognize that this time can be adjusted based upon user and system requirements. At S1204, after the timer in S1202 has initially expired, a determination is made as to whether a voice matching the voiceprint has been heard within the period of the timer. If yes, then the timer continues to run at S1202. If a voice that matches the voiceprint has not been heard, then the process continues to S1206.

At S1206, a determination is made as to whether a longer system timer has been run for occupant in the local area for the matching voiceprint or in a case in which the system could include multiple rooms/areas, then the system, through information sharing techniques, could determine whether the voiceprint has been heard within a time for any of the areas within the system. In some scenarios the local and system timer can be the same. If "no", a longer timer has not been reached, then the process returns to S1202 where the timer continues to run for the duration of the system timer. If "yes", a longer timer has run, then the process continues to S1208.

At S1208, after a voice that matches the voiceprint is no longer heard in the area, it can be assumed that the person is no longer in the area. As such, the voiceprint is deleted and the occupant counter is reduced to correspond to the deleted voiceprint.

At S1210, the timer at S1202 is reset to determine the status of another occupant in the area. Steps S1202, S1204, S1206 and S1208 can be run in parallel to steps S1234 and S1236.

At S1234 in FIG. 12B, the audio sample used to create the voiceprint is deleted.

At S1236, a sensor fusion algorithm is run is obtain environmental and other information from sensors located, for example, in the sensor pod or other sensors that may be located within the light fixture. The sensor fusion algorithm has been described herein with reference to FIG. 11, and functions similarly for the examples in FIGS. 8, 9A and 9B and for simplicity, will not be repeated here.

After the sensor fusion algorithm is completed, the process ends at S1238.

Figure 13A:
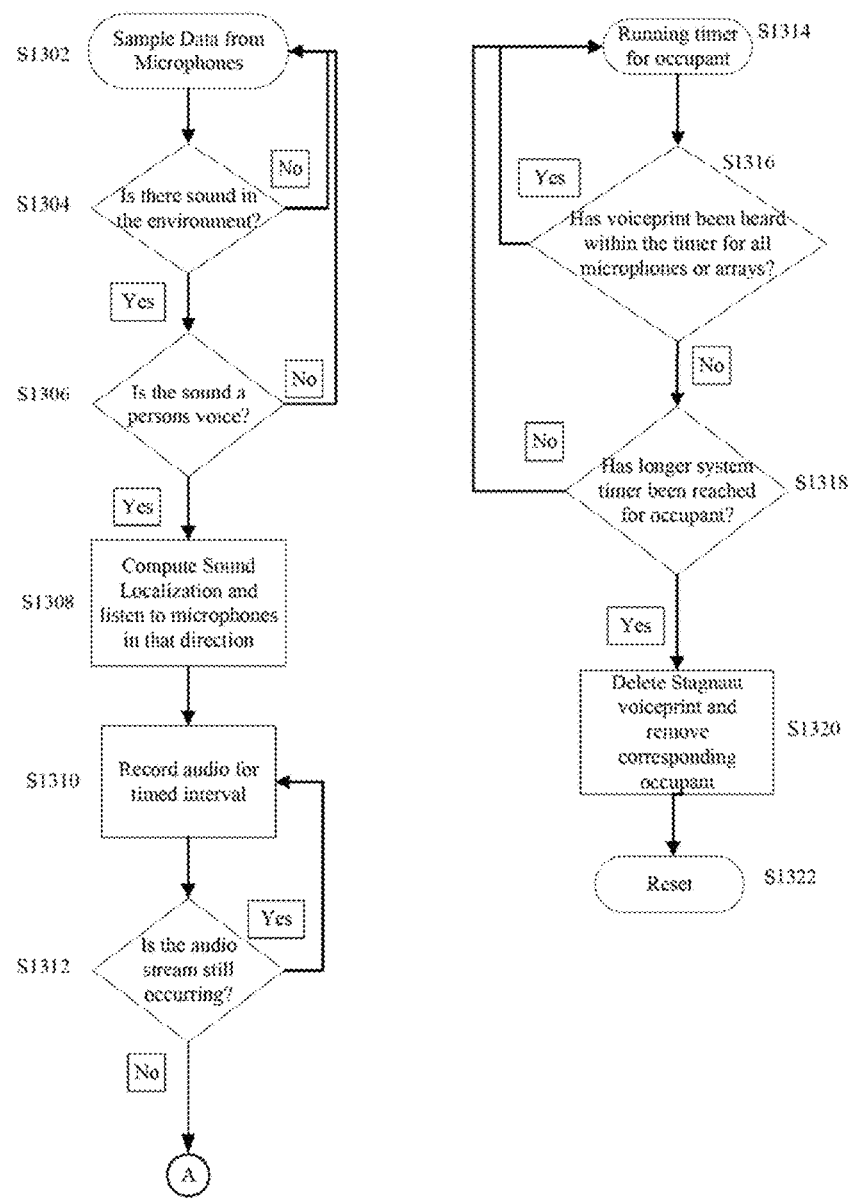
FIGS. 13A and 13B illustrate another example of a method for counting occupants using voiceprinting in a system having multiple microphones in each of multiple light fixtures in an area.
Figure 13B:
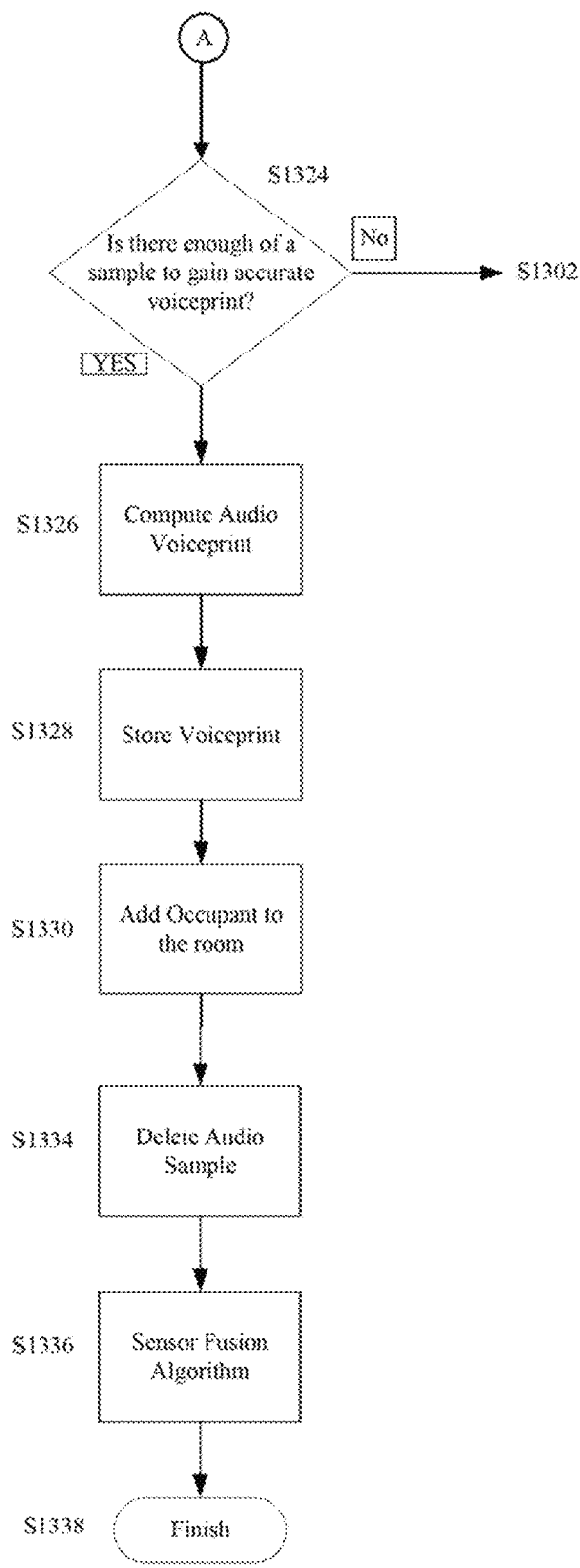

FIGS. 13A and 13B illustrate an example of a method for counting occupants using voiceprinting in a system having multiple microphones in each of a plurality of light fixtures in an area. In the flowchart of FIGS. 13A and 13B, multiple microphones are located within or accessible to a plurality of light fixtures in an area. Utilizing the microphones that are within or accessible to the light fixtures, a number of occupants in an area of the light fixtures can be determined based upon an analysis of the detected sound and creation of a corresponding voiceprint, where the voiceprint is a set of measurable characteristics of a human voice that uniquely identifies an individual, and a direction from which the sound is detected is interpreted as a location of an occupant. The process for determining the number of occupants in an area of the light fixtures for the example in FIGS. 13A and 13B is similar to the example of FIGS. 12A and 12B with the addition of a step for computing sound localization because of the presence of multiple microphones in the example.

Beginning at S1302, the microphones that may be digital or analog, and are within or accessible to multiple light fixtures arranged within a premises or an area are powered on to sample sound within the area. The plurality of microphones may be arranged such that an array of the microphones is arranged within each of the multiple light fixtures. The array of microphones, as described herein, may be any pattern, for example, linear, circular, or at corners of the light fixtures. During the listening or sampling for sound, the processor, which is part of the light fixture, temporarily records audio to obtain sound data from the area. The temporary recordings are stored in a memory of the light fixtures. The microphones continuously listen in short increments of less than one second, for example, for sound within the area, and at S1304, the temporarily recorded sound data from the listening or sampling is analyzed to determine whether sound indicative of human activity, for example, a human voice within a predetermined voice frequency spectrum, is detected in the area. The sampled data from the microphones is digitally represented as, for example, pulse code modulated/pulse density modulation (PCM/PDM) data when the microphone is digital. When the microphones are an analog type, then it would be necessary for the light fixtures, for example, to further include an analog-to-digital (AD) converter to convert the analog signal from the microphones to a digital signal for processing and analysis. At S1304, if no sound indicative of human activity is detected, the microphones continue to listen or sample for sound in the area at S1302. The previously recorded temporary data is deleted after each decision in S1304 to maintain memory space for continued sampling.

If a sound indicative of human activity is detected in the environment at S1304, then at S1306, an analysis is made to determine whether the detected sound is a human voice. The analysis may include, for example, determining whether the detected sound is within a frequency range of, for example, 100-4000 Hz or a sound level within 50-100 dB. If the detected sound is not a human voice, then the process returns to S1304 for continued listening or sampling for sound in the area. If the detected sound is a human voice, the process continues to S1308 and the temporary recording of the sampled data is deleted.

At S1308, a sound localization algorithm, illustrated in FIG. 10, is run. The sound localization algorithm analyzes the direction from which the sound was detected by the microphones within the light fixtures to determine the intensity, time and frequency of the sound in the area.

Beginning at S1002 of FIG. 10, the sampled data is received from each microphone or array of microphones within each light fixture. At S1004, from each microphone, a comparison is made of the phase and direction of the sound data received between the microphones to using the intensity, time and frequency information of the sampled data. At S1006, the intensity, time and frequency information is analyzed to determine an order of reception in which the sound reached the microphones, and to create a noise vector (representing the intensity, frequency and phase) for each sample, where the order of reception can be perceived as the louder sound arriving first and within the frequency of a human voice.

At S1008, a determination is made of whether the sampled signal received is indicative of human activity, for example, a human voice based upon the sample being within a predetermined frequency range of, for example, 100 to 4000 Hz or a sound level within a decibel range of 50-100 dB. If the sampled signal is no longer within the predetermined frequency range, then the process returns to S1004 to compare the phase and direction of any additional sound samples from microphones within the plurality of light fixtures. If the sampled signal is within the predetermined frequency for a human voice or activity, then at S1010, the location information regarding which of the microphones received the sound first, intensity, and direction of the sound are stored in a memory. After the information is stored in the memory, the process of sound localization of the plurality of microphones within each light fixture ends at S1020. When the sound localization algorithm is completed, the process continues to S1310 of FIG. 13A.

At S1310, the processor records the human voice in the area, for example, 10-15 seconds, to create an audio sample of the detected human voice, which is then stored in the memory. At S1312, a determination is made as to whether there is a human voice, i.e., a sample having a frequency range within 100-4000 Hz, continuing in the area. If there is a continuing voice, then the process returns to S1310 where the audio is recorded for additional time of 10-15 seconds, for example. An audio sample is recorded for as long as there is a continued stream of audio in the area. When there is no audio stream in the area, the process continues to S1324.

In FIG. 13B, at S1324, a determination is made of whether the audio sample from S1310 and S1312 contains enough data to create a voiceprint that can be used to uniquely identify a person who is the source of the voice in the area. To contain enough data, the audio sample must include a valid number of varied, spoken words. One of ordinary skill in the art would recognize this may be determined, for example, by speaking a repetitive statement such as "I went to the grocery store today" several times, or speaking a 3-4 sentence long paragraph. If a person only speaks a single, one syllable word, for example, "the," "no," or "yes," repetitively, it will not be enough to gain an accurate voiceprint because there would not be enough variation in voice inflection, tone or syncopation. If the audio sample does not contain enough data to obtain a voiceprint, then the process returns to S1302 to record additional audio for a timed interval. If the audio sample contains enough data to create a voiceprint, then the process continues to S1326

At S1326, a voiceprint is created based upon the audio sample from S1310. A voiceprinting algorithm may be used to calculate the voiceprint. In particular, because the audio sample was recorded in the time domain, the voiceprinting algorithm converts the audio sample to the frequency domain using, for example, a fast Fourier transform (FFT) to provide a spectrogram or visual representation of the specific frequencies of the audio sample. For each frequency in the computation space, there is an amplitude associated with it that gives a unique representation of the audio which is visible to humans. The spectrogram or voiceprint provides a source for comparison of voices in the area with each voiceprint representing a different person in the area.

At S1328, after the voiceprint is created, the voiceprint is stored in the memory of the lighting control device of the light fixtures, and at S1330, an occupant counter is incremented to indicate the presence of a person in the area that corresponds to the voiceprint.

After the occupant counter is incremented at S1330, in FIG. 13A, S1314, a timer local to the area of the light fixture is started to set a time period to confirm whether the person whose voice matches the voiceprint is still present in the area. For example, the timer may be set for an hour or a time period that the user of the system deems appropriate. At S1316, after the timer in S1314 has initially expired, a determination is made to whether a voice matching the voiceprint has been heard within the period of the timer. If yes, then the timer is reset to run at S1314. If a voice that matches the voiceprint has not been heard, then the process continues to S1318.

At S1318, a determination is made as to whether a longer system timer has been reached for occupant in the local area for the matching voiceprint or in a case in which the system could include multiple rooms/areas, then the system, through information sharing techniques known in the art, could determine whether the voiceprint has been heard within a time for any of the areas within the system. In some scenarios, the local and system timers can be the same value. If "no", a longer system has not been reached, then the process returns to S1314 where the timer is reset to continue to run. If "yes", a longer system timer has run, then the process continues to S1320.

At S1320, when a voice that matches the voiceprint is no longer heard in the area, it can be assumed that the person is no longer in the area. As such, the voiceprint is deleted, and the occupant counter is reduced to correspond to the deleted voiceprint.

At S1322, the timer is reset to determine the status of another occupant in the area. Steps S1314, S1316, S1318 and S1320 can be run in parallel to steps S1334 and S1336.

At S1334, the audio sample used to create the voiceprint is deleted.

At S1336, a sensor fusion algorithm is run is obtain environmental and other information from the sensors located, for example, in the sensor pod or other sensors that may be located in the light fixtures. The sensor fusion algorithm has been described herein with reference to FIG. 11, and functions similarly to the examples in FIGS. 8, 9A and 9B, and for simplicity, will not be repeated here.

After the sensor fusion algorithm of S1336 is completed, the process ends at S1338.

Figure 14A:
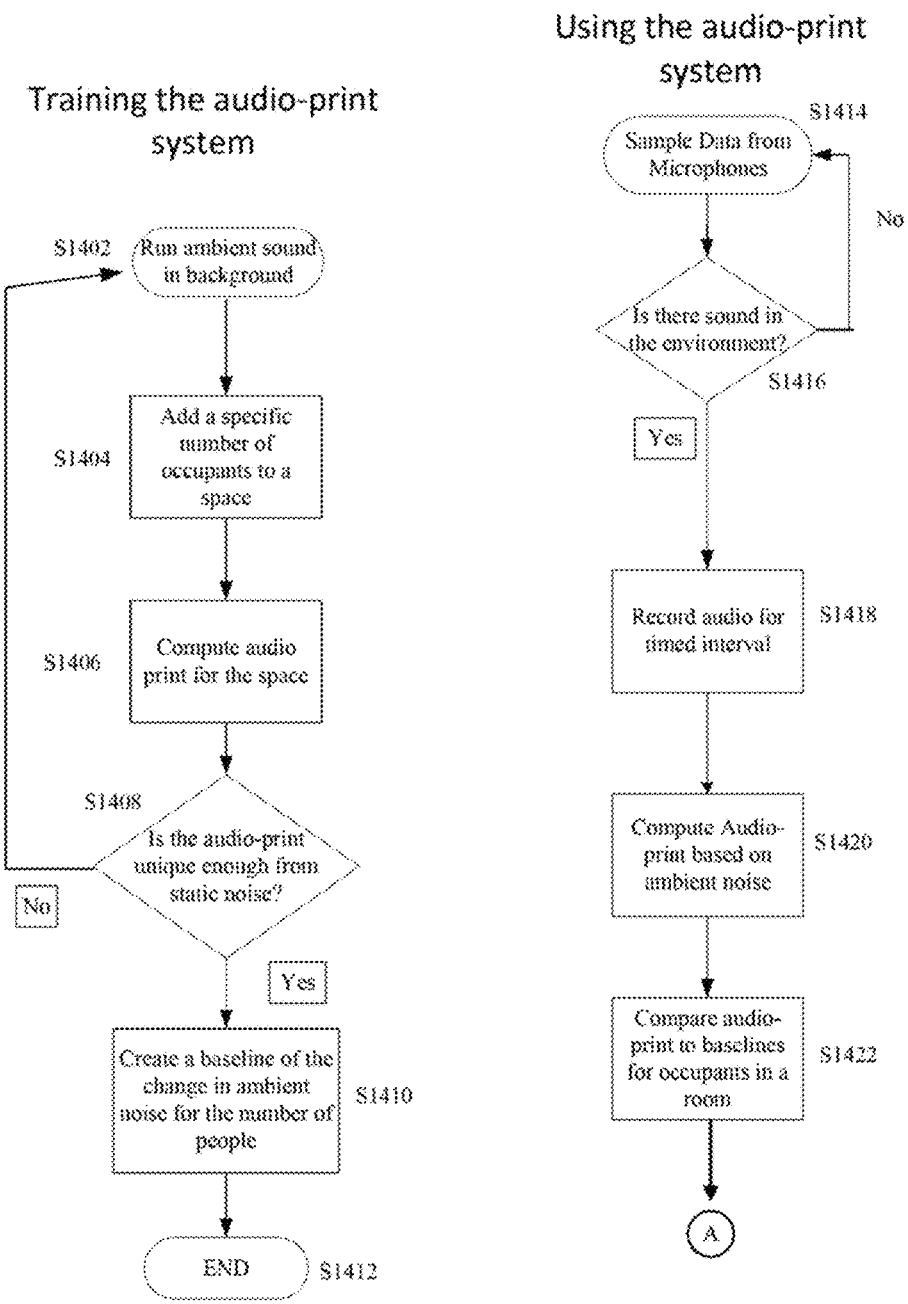
FIGS. 14A and 14B illustrate an example of a method for counting occupants using audio-printing in a system having an array of microphones in each light fixture.
Figure 14B:
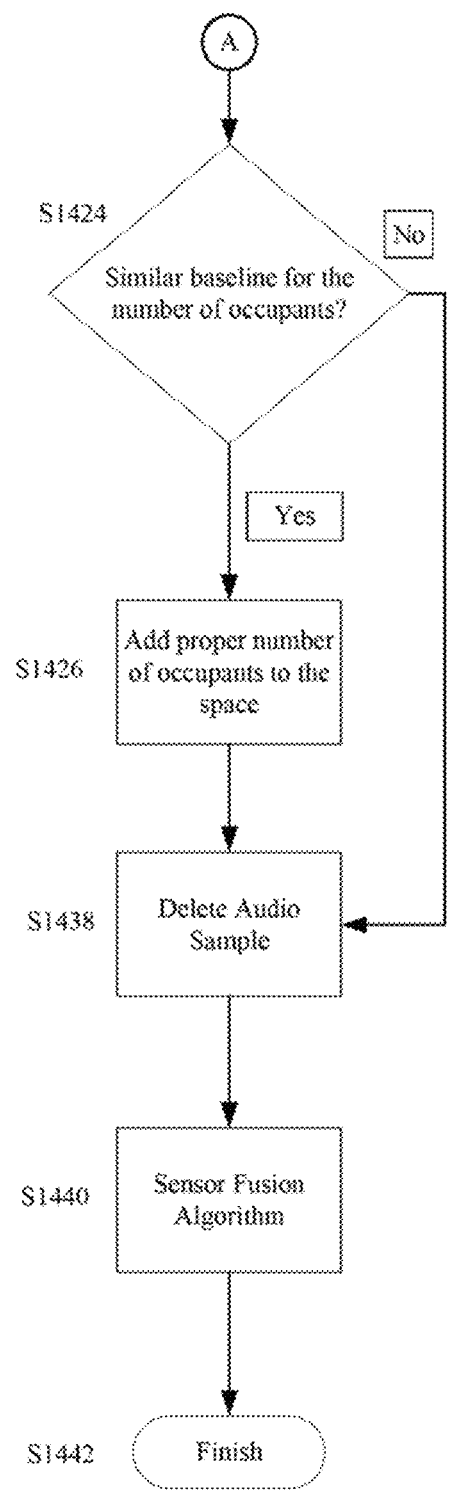

FIGS. 14A and 14B illustrate an example of a method for counting occupancy using audio-printing in a system having an array of microphones in each light fixture. In the method of FIGS. 14A and 14B, the microphones are arranged similar to the methods described in FIGS. 8, 9A-9B, 12A-12B, and 13A-13B and further include a speaker arranged, for example, within the light fixture, to transmit ambient sound into the area.

In the example of FIGS. 14A and 14B, it is necessary to obtain a baseline or historical/training analysis for the room or space that can be used for comparison of how the audio transmitted from the speaker in the light fixture adjusts over time with a known number of occupants in the space. For example, four people in a space in which the ambient sound is transmitted will cause a steep decline in audio amplitude of the ambient sound, and a minute phase shift. In comparison, with two people no phase shift may be detected, but there is an amplitude drop which would not be as much as would be observed for the four people. The training or baseline portion of the method is illustrated on the left side of FIG. 14A.

Beginning at S1402, an audio speaker is used to continuously transmit an ambient background sound into the area of a plurality of light fixtures. The ambient sound may be, for example, white noise around 10 KHz to above human hearing at 60 KHz.

At S1404, as the ambient sound is continuously transmitted into the area, a specific number of test occupants is added to the space to determine changes in amplitude and phase shift for the sound in the room. For example, a test number of occupants are repeatedly added to the space, and, in S1404, the corresponding changes in the phase and intensity of the sound are computed to determine an audio-print for the corresponding number of test occupants.

The audio-print is calculated for each test occupant using an audio-printing algorithm. Because the audio sample of the ambient sound in the background was recorded in the time domain, the audio-printing algorithm converts the ambient sound for each test occupant to the frequency domain using, for example, a fast Fourier transform (FFT) to provide a spectrogram or visual representation of the specific frequencies. For example, for a 15 KHz noise, the audio-print would be calculated based upon the FFT to provide a resulting spectrogram and intensity. Each spectrogram and intensity is different or unique for each person for whom the audio-print would represent. For each frequency in the computation space, there is an associated amplitude that gives a unique representation of the audio which is visible to humans. The spectrogram or audio-print provides a source for comparison of voices in the area with each audio-print representing a different number of persons in the area. Once the audio-print is calculated, the process continues to S1408.

At S1408, a determination is made as to whether the audio-print is unique enough from the ambient background sound including the test occupants. This determination is made based upon an analysis of the test data collected over time for each test occupant that is added into the area and the changes that occur as a result of the added occupants. In the above example of the 15 KHz signal, minute changes in the spectrogram will reflect the uniqueness of a different voice or person in the area. The spectrogram analysis will be reduced, for example, to a 2 KHz window around the frequency value (1 KHz below and 1 KHz above). The intensity of the spectrogram within the 2 KHz window can further be used. A change of 30 dB from the baseline within the 2 KHz window will be understood by one of ordinary skill in the art as a drastic change from the baseline, resulting in a new occupant. The numbers used for the analysis window for spectrogram can be adjusted based upon the initial setup, calibration or needs of the system user. If the audio-print is not unique enough, then the process continues to S1402 to continue the training process where the ambient sound is constantly running in the background, and any additional audio-print is created. If "yes", the audio-print is unique enough, then the process continues to S1410.

At S1410, a baseline is created for each of the number of test occupants and the corresponding change in ambient sound in the area. Once a baseline is created for each of the number of test occupants, then the training or historical analysis is complete at S1412.

At S1414, microphones that are within or accessible to a plurality of light fixtures in an area are turned on to sample the sound within the area and the ambient sound is emitted from the speaker. During the listening or sampling of the sound, a processor which is located within the light fixture temporarily records, in short increments of 1-10 seconds, audio to obtain sound data from the area. The temporary recordings are stored in a memory accessible to the processor. The microphones continuously listen for minute variations in the ambient background sound emitted from the speaker within the area, and at S1416, the temporarily recorded sound data from the listening or samplings is analyzed to determine whether sound indicative of human activity, for example, a human voice (in addition to the ambient background sound) is detected in the area or environment. The sampled data from the microphones is digitally represented as, for example, pulse code modulated/pulse density modulation (PCM/PDM) data when the microphone is digital. When the microphones are an analog type, then it would necessary for the light fixture to further include an analog-to-digital (AD) converter to convert the analog signal from the microphones to a digital signal for processing and analysis. At S1416, if no sound indicative of human activity in addition to the background sound emitted from the speaker is detected, then the microphones continue to listen or sample for additional sound in the area at S1414. The previously recorded temporary data is deleted to maintain memory space for continued sampling.

If a sound indicative of human activity, in addition to the ambient background sound, is detected in the environment at S1416, then at S1418, the processor records the audio sound in the area for a timed interval, for example, 10-15 seconds, to create an audio sample of the sound in the area that is stored in the memory and replaces the temporarily recorded samples from S1414.

At S1420, an audio-print is calculated based upon the audio sample including the ambient background noise recorded at S1418. An audio-printing algorithm may be used to calculate the audio-print. Because the audio sample was recorded in the time domain, it is necessary for the audio-printing algorithm to convert the audio sample into the frequency domain using, for example, a fast fourier transform (FFT) to provide a spectrogram or visual representation of the specific frequencies of the audio sample. For each frequency in the computation space, there is an amplitude associated with it that gives a unique representation of the audio which is visible to humans. As discussed above, the spectrogram representation of the audio-print provides a source for comparison of sound and activity in the area with each audio-print representing a different occupant or person in the area. Once the audio-print is calculated, the process continues to S1422.

At S1422, a comparison is made between the audio-print calculated at S1420 and the baselines created during training at S1410 to determine a number of occupants in the area. During the comparison, it is determined, at S1424, whether there is a similar or matching baseline for the number of occupants in the area, e.g. does the audio-print match any of the baselines created at S1410. If there is no matching baseline for the audio-print, the closest baseline from S1410 will be chosen to provide the number of occupants in the area and the variance from the baseline can be stored in memory. The process continues to S1438 in which the audio-print computed at S1420 is deleted from the memory.

If the audio-print does match a baseline of the change in ambient noise for the number of people calculated at S1410, the process continues to S1426. At S1426, an occupant counter is incremented to correspond to the number of occupants identified in the matching baseline of the training process. After the occupant counter has been incremented, at S1438, the audio-print calculated at S1420 and used in the comparison is deleted.

At S1440, a sensor fusion algorithm is run to obtain environmental and other information from the sensors located, for example, in the sensor pod or other sensors that may be located in the light fixtures. The sensor fusion algorithm is used to augment or corroborate the data received from the microphones accessible to the multiple light fixtures. FIG. 11 illustrates the steps of the sensor fusion algorithm. The sensor fusion algorithm can be used with data collected from the sensors in the sensor pod, described above, or any additional sensors that may be arranged within the multiple light fixtures. For example, in additional to the array of microphones discussed above that are arranged within or accessible to each of the plurality of light fixtures, the light fixtures may also include, a light sensor, a motion sensor such as a PIR, or a temperature sensor, similar to those described above for the sensor pods. During the implementation of the sensor fusion algorithm, in S1102, the environmental data from the various sensors arranged within the plurality of light fixtures or within a sensor pod that is accessible to the plurality of light fixtures is received by a processor. At S1104, the actual, raw (unprocessed) data received by the processor from the various sensors is organized into data types for analysis, for example, temperature, voice, animal, light, machine, scents, occupancy, etc. For example, if the microphone(s) calculations initially read the room as having twelve (12) occupants, but camera data from a sensor in sensor pod only reflect two (2) occupants, then a temperature estimation for use with an HVAC system may be drastically different from what would be needed for the area. As a result, a user of system may select data types related to temperature to augment or corroborate the data calculations of the microphones.

At S1106, a historical analysis is performed on the organized types of data to determine a prior occurrence or history of the data from devices within the sensor pod to transform the sensor data into the selected data type in S1104. The sensor data is transformed using a transformation model which is a mathematical function used to predict, for example, a number of people in a given room/environment for a sensor calibrated variable in the room such as a number HVAC, open doors, active CO2 sources, etc. The mathematical model can evolve to become more accurate and reject, using machine learning, data that may be too erroneous.

At S1108, when the transformation analysis of S1106 is completed, a data confidence level for each sensor within the sensor pod is updated base upon having a value or pattern of a prior occurrence or history, i.e., within an expected value or range, or how accurate has data from the sensor been with respect to prior predictions. The data confidence level for each sensor indicates the reliability of the observation or data from the sensor where a lower confidence level indicates lower reliability.

At S1110, the weights for each sensor are updated. The confidence level of S1108 may effect weights assigned to each sensor. Weights are assigned to each observation, for example, the observed data type for each sensor, using a weight function to provide outputs that are heavily influenced by parameters that have more weight, and less influenced by parameters with lower weight. The weight is a fractional value, where all the possibilities add up to 100. In an example, an occupancy level may have four (4) states such as: no people, low occupancy, medium occupancy, and high occupancy. Based on sensor values of high room occupancy, high CO2, and loud noise, a weight for "high occupancy" would be assigned 90%.

At S1112, the results of the historical analysis are compared to audio-prints stored in the memory during the baseline training to determine the level of variance from the baseline training predictive model. At S1114, if the results of the historical analysis enhances or alters the predictive baseline results that were stored in memory, e.g. the historical analysis is enough to change whether the occupancy counter should have been incremented or not, a state estimation model of the data type is updated. In particular, the update is used to form a consensus of the results of observations from the multiple sensors.

At S1116, the updated estimation model data is stored as predictive model data for a next data state comparison. At S1118, the predictive data of S1116 is transmitted to the requesting system. The requesting system may be an occupancy detection system, an HVAC system, etc. to provide feedback for system heating/cooling settings based upon the occupants in the area. The algorithm is finished at S1120.

After the sensor fusion algorithm of S1440 is complete, the method of counting people using audio-printing is complete at S1442.

Program aspects of the technology may be thought of as "products" or "articles of manufacture" typically in the form of executable code and/or associated data that is carried on or embodied in a type of machine readable medium. For example, programming code could include code for the micro-control unit (MCU), CPU or the processor of the gateway server. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunications networks. Such communications, for example, may enable loading of the software from one computer or processor into another, for example, from a management server or host computer of the service provider into the computer platforms of the media gateway and client device. Thus, another type of media that may bear the programming, media content includes optical, electrical and electromagnetic waves, such as used across physical interfaces between local devices, through wired and optical landline networks and over various air-links. The physical elements that carry such waves, such as wired or wireless links also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical of magnetic disks, such as any of the storage devices in any computer(s) or the like, such as may be used to implement the devices, media gateway, shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example, floppy disks, a flexible disk, hard disk, magnetic tape or other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequence of one or more instructions to a processor for execution.

In general, the term "application", as used herein refers to logic embedded in hardware or software instructions, which can be written in a programming language, such as Java, C, C++, or C Sharp, for example. A software application can be compiled into executable programs or written in interpreted programming languages, such as Perl, Visual Basic Script, HTML, or Java Script. Software applications may be callable from other applications. Generally, applications described herein refer to logical modules that may be merged with other modules or divided into sub-module despite their physical organization. The applications can be stored in any type of computer storage device and can be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirements of Sections 101, 102, or 103 of the Patent Act, nor should they be interpreted in such a way. An unintended embracement of such subject matter is hereby disclaimed.

Except as stated immediately above, nothing that has been stated or illustrated is intended or should be interpreted to cause a dedication of any component, step, features, object, benefit, advantage to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
   a data network;
   a light fixture, comprising:
      a light source;
      intelligent driver circuitry coupled to the light source to provide power to the light source;
      a lighting control device coupled to the intelligent driver circuitry to control a light output and operations of the light source in an area; and
      a network interface to enable the light fixture to receive communication via the data network;
   wherein the lighting control device of the light fixture comprises:
      a processor coupled to the intelligent driver circuitry, and the network interface; and
      memory coupled to be accessible to the processor, wherein the memory stores programming for execution by the processor and data to be stored or processed by the processor during execution of instructions included in the programming; and
      a microphone coupled to the lighting control device,
   wherein execution of the programming in the memory configures the processor to:
      control the microphone to sample and detect a sound in the area;
      analyze the detected sound to determine a sound type and decibel level;
      determine, when the detected sound is a predetermined sound type and exceeds a threshold level, a vector of the detected sound relative to a position of the microphone coupled to the lighting control device of the light fixture and an order of sound reception of the sound to the microphone in the area,
   wherein the order of sound reception represents a location of an occupant in the area;

store the determined location of the sound in the memory; and increment an occupant counter to correspond to each newly determined location of sound in the area for a predetermined period of time.

2. The system of claim 1, further comprising a sensor pod coupled to and accessible to the lighting control device, wherein the sensor pod includes a plurality of sensors arranged to detect aspects of an environment in the area, and a network interface.

3. The system of claim 2, wherein the sensor pod further includes a microphone configured to detect a sound in the area, wherein the detected sound received by the microphone of the sensor pod is used to corroborate the location of the detected sound of the microphone coupled to the lighting control device.

4. The system of claim 2, wherein the communication between the light fixture and the sensor pod is by a mesh network.

5. The system of claim 4, wherein the light fixture further comprises a synchronizing clock coupled to and accessible to the lighting control device and the sensor pod, the synchronizing clock being configured to generate a timestamp signal that is transmitted to the intelligent driver circuitry of the lighting control device and a controller in the sensor pod.

6. The system of claim 1, further comprising:
a centralized server coupled to and accessible to the lighting control device, wherein the centralized server comprises a network interface to enable the centralized server to communicate with the light fixture over the data network; and
a synchronizing clock coupled to the centralized server and configured to generate a timestamp signal that is transmitted to the light fixture via the centralized server, wherein data from the light fixture and the microphone is time synced by the centralized server based upon the timestamp signal.

7. The system of claim 6, further comprising a server outside the area and accessible to the light fixture via the centralized server and a wide area network.

8. The system of claim 6, wherein:
the network interfaces of each of the centralized server, and the light fixture comprise a wireless transceiver;
the data network is a wireless network formed by the wireless transceivers of the centralized server, and the light fixture, and
the data network is configured to enable data communication within the area and to provide data communication access to a wide area network extending outside the area.

9. The system of claim 8, wherein the data communication uses at least one of Wifi, Bluetooth Low Energy (BLE), Ethernet, RS485, Zigbee, Z-wave, or LiFi protocol.

10. The system of claim 6, wherein the synchronizing clock uses one of a Clock Sampling Mutual Network Synchronization (CSMNS) or Network Time Protocol (NTP) for transmitting the timestamp signal.

11. The system of claim 1, further comprising a plurality of microphones arranged within the light fixture.

12. A method of using sound localization to count occupants, comprising:
controlling a microphone accessible to each of a plurality of light fixtures to sample sound in an area;
analyzing the sampled sound from the microphone accessible to each of the plurality of light fixtures to detect an audio frequency and decibel level of the sampled sound;
calculating, when the audio frequency and decibel levels are at least a predetermined threshold level, location information of the sampled sound, wherein the calculating comprises:
determining a time, intensity, and frequency of the sampled sound in the area;
comparing a phase of the sampled sound using the determined time, intensity and frequency of each sampled sound to determine an order of sound reception of the sound to the microphone in the area, and based on the comparison, provide a noise vector of the sound, wherein the order of sound reception represents a location and voice frequency of an occupant in the area;
incrementing an occupancy counter based on each noise vector; and
storing the order of sound reception information and an identification of the microphone from which the sound is received in a memory.

13. The method of claim 12, further comprising:
continued controlling of the microphone accessible to each of the plurality of light fixtures to detect any additional sound in the area;
determining a noise vector of the additional sound based upon intensity, time and frequency of the additional sound; and
comparing the noise vector of the additional detected sound in the area to the noise vector of the stored order of sound reception information and identification of the microphone from which the sampled sounds were detected,
wherein when the noise vector of the additional detected sound does not match the noise vector of the stored order of sound reception information and identification of the microphone, the occupancy counter is incremented, and
wherein when the noise vector of the additional detected sound matches the noise vector of the stored order of sound reception information and identification of the microphone from which the sampled sounds were detected, the occupancy counter is not incremented.

14. The method of claim 12, further comprising:
receiving at least one of environmental data or sound data from a plurality of sensors arranged within the plurality of light fixtures or arranged within a sensor pod in the area accessible to each of the plurality of light fixtures;
organizing the received at least one of environmental data or sound data into types of data;
performing an analysis on the organized types of data to determine a prior occurrence of the data in the area;
comparing results of the analysis of the organized types of data to the stored order of sound reception information and the identification of the microphone; and
transmitting, when the results of the analysis of the organized types of data are different from the stored order of sound reception information and the identification of the microphone, the results of the analysis of the organized types of data to a processor accessible to the plurality of light fixtures to enhance the comparison of the phase to the time, intensity and frequency of each sampled sound to determine the order of sound reception, wherein the order of sound reception represents the location of an occupant in the area.

15. The method of claim 12, further comprising saving the results of the analysis in the memory.

16. A method of using voiceprinting to count people in an area, comprising:
controlling a microphone accessible to each of a plurality of light fixtures to sample audio in the area;
analyzing the sampled audio from the microphone to determine an audio frequency and decibel level of the sampled audio;
determining whether the sampled audio is a predetermined threshold level of a human voice based upon the audio frequency and decibel levels;
recording audio of the human voice received by the microphone for a timed duration of the human voice in the area;
calculating a voiceprint of the human voice in the area based upon applying a fast Fourier transform (FFT) to the recorded audio of the human voice; and
storing the voiceprint in a memory and incrementing an occupant counter to correspond to the stored voiceprint.

17. The method of claim 16, wherein the sampled audio from the microphone is deleted after the corresponding voiceprint is stored in the memory and the occupant counter incremented.

18. The method of claim 16, further comprising:
activating a timer when the occupant counter is incremented to determine a continued presence of the human voice in the area that matches the voiceprint;
confirming an additional occurrence of the human voice matching the voiceprint within a predetermined period of the timer;
deleting the voiceprint when no additional occurrence of the human voice matching the voiceprint within the predetermined period of the time; and
subtracting from the occupant counter to correspond to the deleted voiceprint.

19. The method of claim 16, further comprising:
collecting at least one of environmental data or sound data from a plurality of sensors arranged within the plurality of light fixtures or arranged within a sensor pod in the area and accessible to each of the plurality of light fixtures;
organizing the received at least one of environmental data or sound data into types of data;
performing an analysis on the organized types of data to determine a prior occurrence of the environmental or sound data in the area;
comparing results of the analysis of the organized types of data to the calculated voiceprint to determine a cross-reference therebetween;
transmitting, when the results of the analysis are different from the stored voiceprint, the results of the analysis of the organized types of data to a processor accessible to the plurality of light fixtures to recalculate the voiceprint based upon applying the fast Fourier transform (FFT) to the analysis; and
incrementing the occupancy counter for each recalculated voiceprint.

20. The method of claim 16, further comprising a plurality of microphones configured to be accessible to each of the plurality of light fixtures.

21. The method of claim 20, further comprising:
after determining whether the sampled audio is a human voice based upon the audio frequency level, calculating location information of the sampled audio of the human voice received from each of the plurality of microphones;
comparing a phase of the audio received by the plurality of microphones using time, intensity and frequency of the sampled audio to determine an order of sound reception to each microphone in the area; and
storing the order of sound reception information and identification information of the plurality of microphones from which the audio is received in a memory.

22. A method of using audio-printing to count occupants, comprising:
emitting, via an audio speaker accessible to a plurality of light fixtures arranged in an area, an ambient sound in a background environment of the area;
adding, during a training mode, a specific number of occupants to the area;
calculating a baseline audio-print for the ambient sound based upon each specific number of occupants added in the area during the training mode;
comparing the baseline audio-print to the ambient sound to provide a baseline of change in ambient sound for each specific number of occupants added in the area;
controlling, after the training mode, a microphone accessible to each of the plurality of light fixtures to sample audio in the area of the plurality of light fixtures;
analyzing the sampled audio from the microphone to determine an audio frequency level of the sampled audio;
determining whether the audio frequency level of the sampled audio is greater than a predetermined decibel level of the ambient background sound;
recording audio in the area for a period of time when the audio frequency level is greater than the predetermined decibel level of the ambient sound in the background environment of the area;
calculating, via application of a fast Fourier transform (FFT) analysis, an audio-print for the recorded audio based upon a difference in a decibel level between the recorded audio and the ambient sound emitted into the area;
comparing the calculated audio-print to the baseline audio-print to determine a corresponding number of occupants in the area when the calculated audio-print is approximately the same as the baseline audio-print;
incrementing an occupant counter for each corresponding determined number of occupants when the calculated audio-print is approximately the same as the baseline audio-print.

23. The method of claim 22, further comprising after incrementing the occupant counter for each corresponding determined number of occupants, deleting the sampled audio received from the at least one microphone.

24. The method of claim 22, further comprising:
collecting at least one of environmental data or sound data from a plurality of sensors arranged within the plurality of light fixtures or a sensor pad in the area and accessible to each of the plurality of light fixtures;
organizing the received at least one of environmental data and sound data into types of data;
performing an analysis of the organized types of data to determine a prior occurrence of the data in the area;
comparing results of the analysis of the organized types of data to the calculated audio-print to determine a cross-reference therebetween; and
transmitting, when the results of the analysis are different from the number of occupants for the calculated audio-print, the results of the analysis of the organized types of data to a processor accessible to the plurality of light fixtures to adjust the occupant counter to correspond to a new number of occupants in the area.

25. The method of claim 24, further comprising transmitting the results of the analysis to a memory.

* * * * *